US006885819B2

(12) United States Patent
Shinohara

(10) Patent No.: US 6,885,819 B2
(45) Date of Patent: Apr. 26, 2005

(54) CAMERA, DEVICE FOR CAPTURING OBJECT IMAGE, AUTOMATIC FOCUS ADJUSTING SYSTEM AND METHOD FOR ADJUSTING AUTOMATIC FOCUS FOR THE SAME

(75) Inventor: Junichi Shinohara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 93 days.

(21) Appl. No.: 10/367,871

(22) Filed: Feb. 19, 2003

(65) Prior Publication Data

US 2003/0165333 A1 Sep. 4, 2003

(30) Foreign Application Priority Data

Feb. 19, 2002 (JP) ...................................... 2002-041427

(51) Int. Cl.⁷ .............................................. G03B 13/36
(52) U.S. Cl. ...................... 396/127; 396/133; 348/345; 250/201.2
(58) Field of Search ........................... 250/201.2, 201.3, 250/201.7; 348/349–356, 345, 347; 396/89, 101, 125–129, 133

(56) References Cited

U.S. PATENT DOCUMENTS

| 4,841,325 A | 6/1989 | Hoshino, et al. ............... 396/75 |
| 5,075,777 A | * 12/1991 | Murata ........................ 348/534 |
| 2001/0010556 A1 | * 8/2001 | Sugimoto et al. ............ 348/345 |

FOREIGN PATENT DOCUMENTS

EP 0 520 764 12/1992

OTHER PUBLICATIONS

U.S. patent application Ser. No. 10/367,871, Shinohara, filed Feb. 19, 2003.
U.S. patent application Ser. No. Shinohara et al., filed Aug. 8, 2003.
U.S. patent application Ser. No. 10/641,050, Shinohara et al., filed Aug. 15, 2003.

* cited by examiner

Primary Examiner—W. B. Perkey
(74) Attorney, Agent, or Firm—Oblon, Spivak, McClelland, Maier & Neustadt, P.C.

(57) ABSTRACT

System controller (10) seeks a focus adjusting evaluating value which is indicative of focus adjusting state as a criterion from object image information, and searches a focus adjusted position where focus adjusting evaluating value becomes the most appropriate and drives the focus operating means to the focus adjusted position to perform a focus adjusting by a focus adjusting scan to obtain a plurality of focus adjusting evaluating value by operating the focus adjusting evaluating value detecting means while driving focusing lens (1a) in at lease one way of continuous way or intermittent way which varies focus adjusting state of the object image.

System controller (10) shifts a scan starting point from an initial locating position Po of the focusing lens (1a) in a first predetermined amount of distance in a predetermined direction then initiate scan from the initial locating position toward an opposite direction to the predetermined direction.

25 Claims, 15 Drawing Sheets

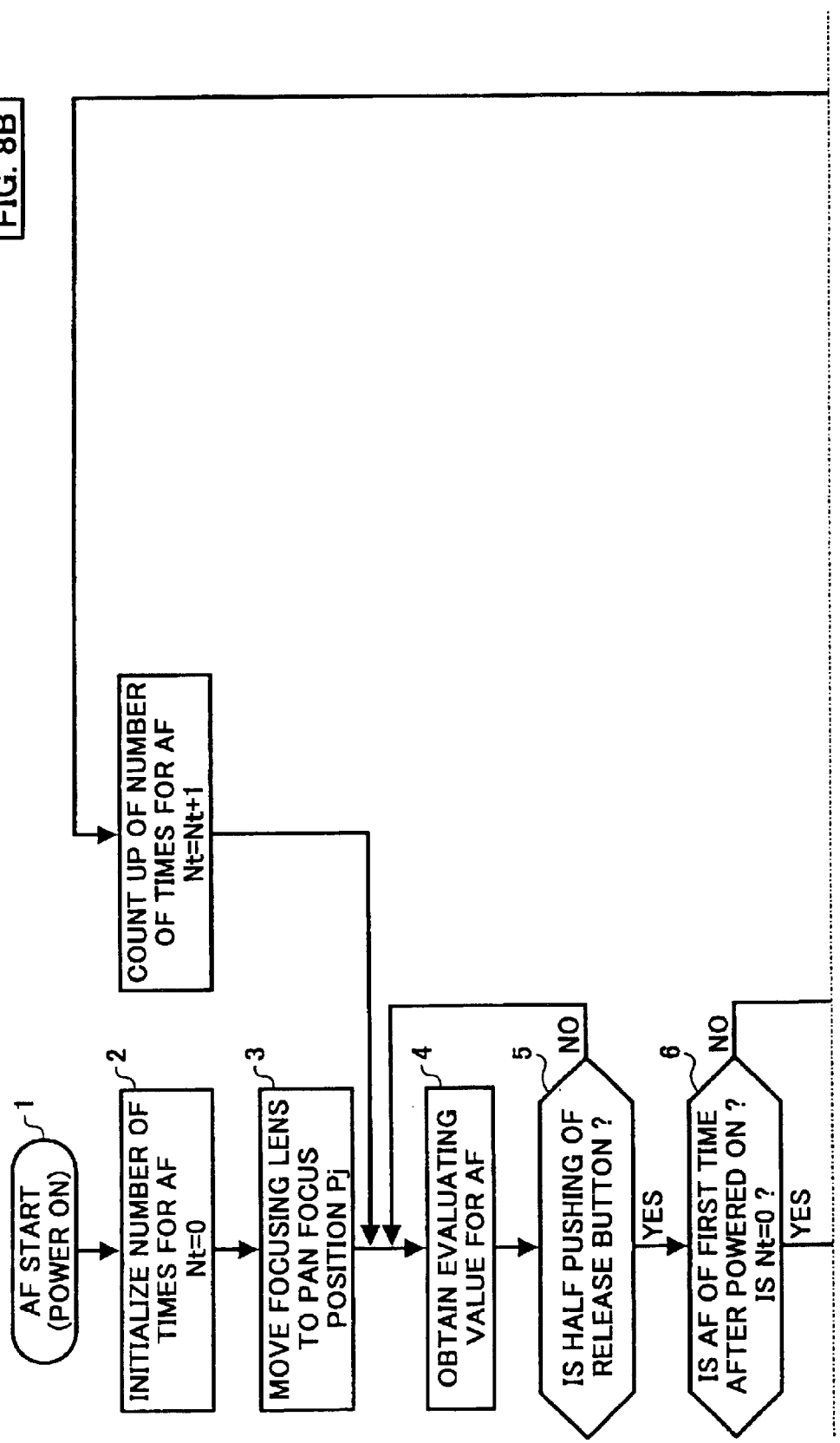

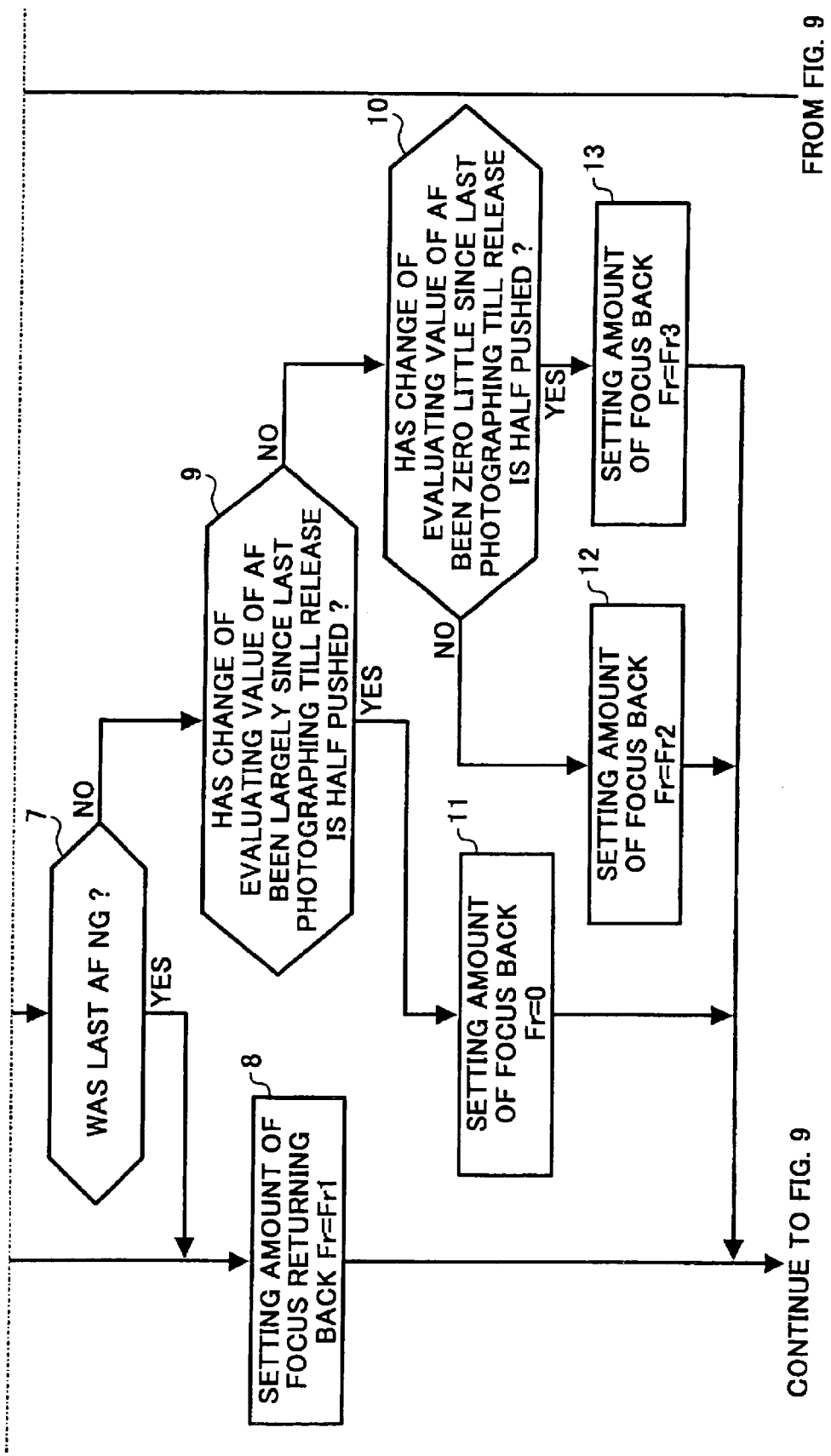

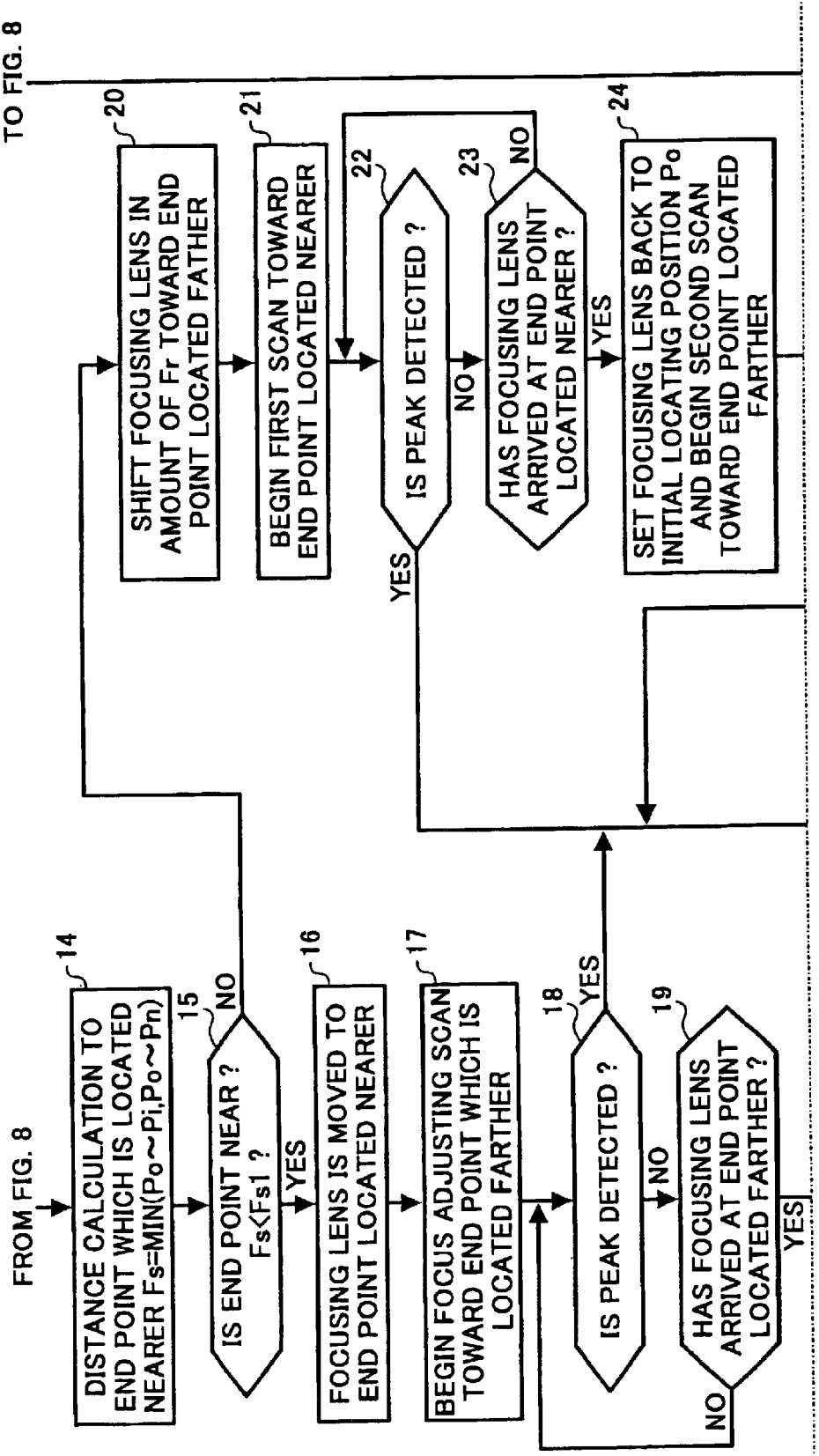

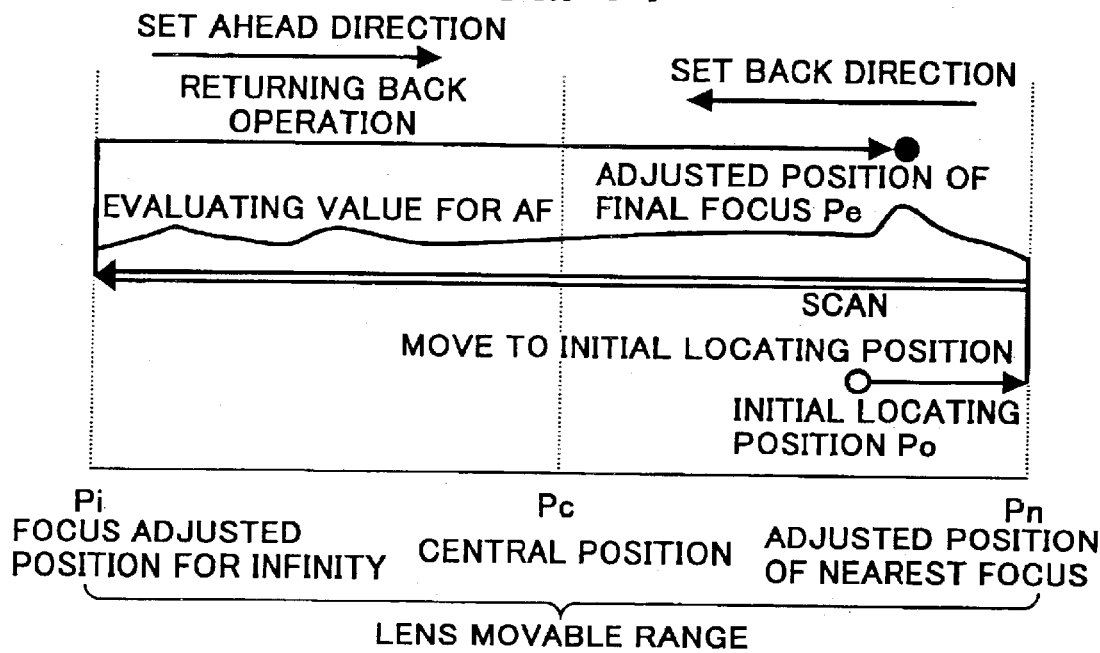
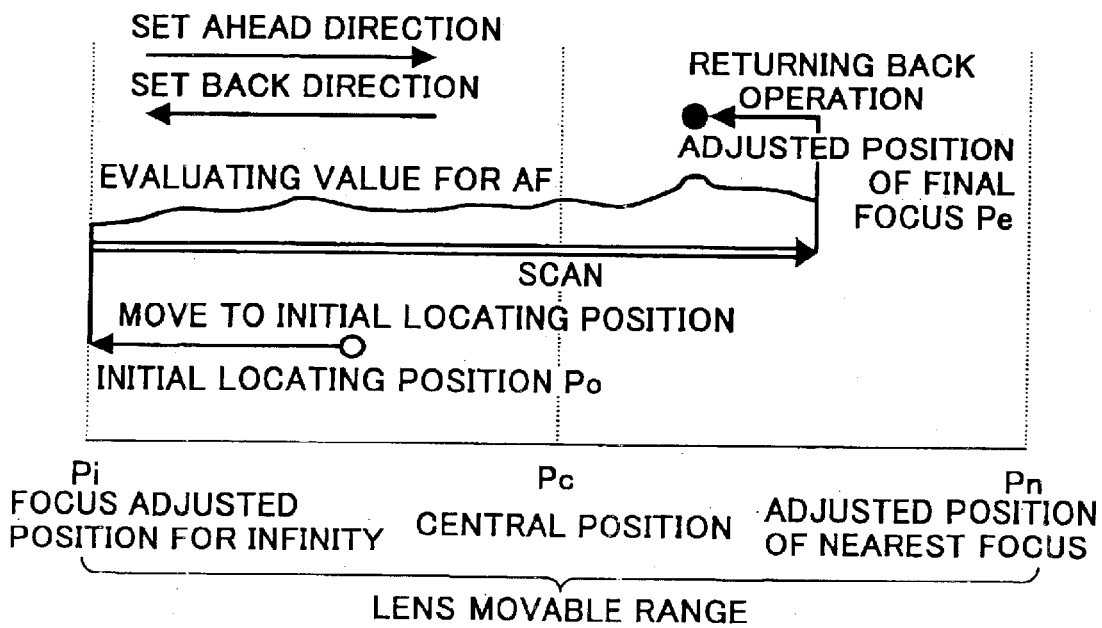

CAMERA, DEVICE FOR CAPTURING OBJECT IMAGE, AUTOMATIC FOCUS ADJUSTING SYSTEM AND METHOD FOR ADJUSTING AUTOMATIC FOCUS FOR THE SAME

BACKGROUND OF THE INVENTION

1. Field of the Invention

The present invention relates to an automatic focus adjusting (hereinafter it is referred to also as "AF") system which is so called auto focus adjusting system or auto focus system, and more particularly, this invention relates to an automatic focus adjusting system and a method for adjusting automatic focus capable of focus adjusting by focus adjusting scanning in that focus adjusting state of an object image is varied, an evaluating value of focus adjusting which is indicative of focus adjusting state as a criterion is sought from object image information corresponding to the object image, the focus adjusting state is varied continuously or intermittently and a plurality of the evaluating values are obtained such that a focus adjusting state is searched in which the evaluating value of focus adjusting is the most appropriate, and relates to camera which utilizes the system and the method, an image input device including image scanner and copying machine, and an image capturing apparatus including optical observing equipment having microscope, telescope, binoculars and endoscope.

2. Description of the Prior Art

Generally in digital cameras many of them perform an automatic focus adjusting (AF) operation in which focusing lens (focus lens) that contributes to focus adjusting among photographing optical system is driven, image information is taken by image capturing device, for example, such as CCD (charge coupled device) and the like, a high frequency component of the image information is selected as an evaluating value of focus adjusting, that is to say, as an "evaluating value for AF (auto focusing)", and a focus driving range is scanned then the focus lens is reset at a position where the evaluating value for AF has a peak. Commonly this automatic focus adjusting (AF) method is called as CCDAF.

A most basic CCDAF operation is schematically shown in FIG. 10 and FIG. 11. In this CCDAF operation a scan starting point is set on an end point for infinity and it is moved to the end point regardless of a position where the focusing lens locates when a sweep for the focus adjusting operation for the automatic focus adjusting is started, that is to say an initial locating point, and the scan is performed till an end point for the adjusted position of nearest focus and peak position is searched to adjust focusing on the point. Curves in FIG. 10 and FIG. 11 are schematically depicted in a condition that evaluating values for AF detected in the scanning are plotted in the vertical axis. In this respect depending upon the structure of a lens driving system, an operation to remove an effect caused by a back lash of gears and the like may be required, however, descriptions about constitution and operation to remove this back lash are omitted in the following specification and drawings because this kind of operation is related to so many various kind of technology which are well known in the art.

As shown in FIG. 10 and FIG. 11 when the operation for automatic focus adjusting is ordered, a focusing lens is at the setout moved from an initial locating position (that is to say a stopping position of the focusing lens at the time point) Po to an end point for infinity, that is to say the focusing lens is once moved toward a direction in which the lens is set back in this case, to focus adjusted position for infinity Pi, as a scan starting point, then the focus adjusting operation is performed in the direction of setting ahead within a whole range of focus adjusting scanning from the focus adjusted position for infinity Pi to the adjusted position of nearest focus Pn. By this whole range scanning, peak position of the evaluating value for AF is detected as a focus adjusted position, in other words as a adjusted position of final focus Pe, then after the whole range scanning the focusing lens is set at the adjusted position of final focus Pe by a returning back operation toward the setting back direction and then the automatic focus adjusting is completed.

FIG. 10 shows a case when the initial locating point Po is located in a side of the end point for infinity in relation to a central position Pc of the lens movable range, and FIG. 11 shows a case when the initial locating point Po is located in a side of the adjusted position of nearest focus in relation to a central position Pc of the lens movable range.

In the devices depicted in FIG. 10 and FIG. 11 they spend so much useless time because they have comparatively many lens movements other than for actual focus adjusting scan such as the moving operation to the scan starting point, returning back operation to the focus adjusted position and the like. For example in the device shown in FIG. 11, because the operation is once returned to the end point for infinity Pi though the initial locating position Po is located at a position near to the adjusted position of nearest focus Pn, it is made to move across almost all the lens movable range.

On the other hand a method depicted in FIG. 12, FIG. 13 and FIG. 14 is arranged to move the focusing lens at the setout from the initial locating position Po to any "one end which is located nearer" selected from the end point for infinity and the end point for the adjusted position of nearest focus, and then scanning is begun from the nearer point. That is to say when the automatic focus adjusting is ordered, as shown in FIG. 12 to FIG. 14, one end point which is nearer to the initial locating position is selected from the end point for infinity Pi and the end point for the adjusted position of nearest focus Pn which are both ends of the lens movable range, is specified as a starting point of the scanning, and the focusing lens is moved to the specified end point at the setout, then the focus adjusting scan across the whole focus adjusting scan range is performed from the specified end point to the other end point. By this whole range scanning, the peak position of AF evaluation value is detected as the adjusted position of final focus Pe and the focusing lens is set at the adjusted position of final focus Pc by a returning back operation of the focusing lens after the whole range scanning then the automatic focus adjusting is completed.

FIG. 12 shows a case when the initial locating point Po is located in a side of the end point for infinity Pi in relation to the central position Pc of lens movable range, FIG. 13 shows a case when the initial locating point Po is located in a side of the end point for the adjusted position of nearest focus Pn in relation to the central position Pc of lens movable range, and FIG. 14 shows a case when the initial locating point Po is located in a side of the end point for the adjusted position of nearest focus Pn in relation to the central position Pc of lens movable range and especially FIG. 14 shows a case the adjusted position of final focus Pe is located between the initial locating point Po and the above mentioned the nearer end point. By a method of this kind time until the whole range scanning is begun, can be cut down.

However in a method depicted in FIG. 12 to FIG. 14, because the scanning direction in the method is changed according to the initial locating point Po, in a case when the evaluating value for AF has a "dependence of scanning direction", a calibration equal to an amount of the dependence must be achieved. In fact it is usual that the evaluating value for AF has the dependence of scanning direction caused by the above mentioned back lash, a discrepancy of mechanical time constant because of difference in moving direction of the focusing lens and the like, an appropriate calibration for the dependence of scanning direction must be achieved by means of dependence of scanning direction data which were obtained through an experimental manufacturing stage.

Moreover it becomes an important factor that a shortening of the focus adjusting operation is cut down when speeding up of automatic focus adjusting operation is intended. That is to say, in the devices depicted in FIG. 10 and FIG. 11, and FIG. 12 to FIG. 14, it is not a moving operation from the initial locating position Po to the scan starting point and a returning operation to the final focus adjusted point Pe after the full range scanning but a time for whole range scanning in other wards, a time period which is required to perform whole range scanning across all area of the focus adjusting scan, that in fact occupies a major part of the time of automatic focus adjusting.

A number of data to be obtained by a scanning for focus adjusting operation is decided depending upon characteristics of a focusing lens and CCD as a image capturing element, and in usual case if a focusing motor which drives the focusing lens is a pulse motor, it is required to obtain one datum in every two or four pulses of the focusing motor. Usually a frequency of obtaining image information in the image capturing element and the like is about a level of one thirtieth (1/30) second, because of this, it is required a driving whose every one pulse of focusing motor takes one sixtieth (1/60) to one—one hundred twentieth (1/120) second. That is to say data are obtained while the focusing motor is driven in a state of 60 to 120 pps (pulse per second) as a rate of pulse for the focusing motor.

On the other band because the moving operation to the scan starting point and a returning operation to the focus adjusted position are decided only by a mechanical constraint at the operating mechanism, they are usually driven in a state of 500 to 1000 pps as a rate of pulse. That is to say even when the same number of pulses are counted these two operations have time difference in level of about 4 to 17 times. By this reason it is more effective to be narrower for an area to be scanned to attain a cutting down of time for automatic focus adjusting required in automatic focus adjusting operation.

FIG. 15, FIG. 16 and FIG. 17 show other conventional method for automatic focus adjusting which is arranged under considering with the above described problems, it is a method to realize a speeding up by means of a sequence that "when a peak of evaluating value for AF is detected, the scanning is interrupted and the focusing lens is moved to the detected peak position." In this method it is significantly important that "how is it judged that a peak of evaluating value for AF is detected?" That is to say it is not rare that a plurality of peaks of evaluating value for AF are generated because a plurality of object to be photographed can exist in different distance at a same time in actual using condition. In a situation where plurality of peak are generated in evaluating value for AF as above described, the peak must be detected with a strict judgment about an absolute value of evaluating value for AF at a peak, a relative value to other evaluating value for AF (evaluating value for AF for peripheral area, evaluating value for AF at other peak like portion and so on), further a tendency of gradient of evaluating value for AF around a peak and the like in order to match a focus adjusted position onto a peak that the operator is actually expecting.

For this purpose it is arranged that a judgment is made when the scanning has been continued for a moment around a certain area, even after a portion which seems to include a peak is passed in a process the focus adjusting scan as shown in FIG. 15 to FIG. 17. When a focus adjusting operation is ordered, one end which is located nearer to the initial locating position Po is selected as a scan starting point from the end point for infinity Pi or adjusted position of nearest focus Pn at the both ends of a lens movable range, and at the setout the focusing lens is moved to the scan starting point, then the focus adjusting scan is performed toward another end point as shown in FIG. 15 to FIG. 17. When a peak of evaluating value for AF is detected in a process of the focus adjusting scan, the peak is checked while the scanning is continued for a moment around a certain area, based on a result of checking, a peak position of evaluating value for AF is judged as a focus adjusted position in other words as a focus adjusted position Pe then the focus adjusting scan is stopped and the focusing lens is set on the focus adjusted position Pe by an moving back operation thereby the automatic focus adjusting operation is completed. FIG. 15 shows a case when the initial locating point Po is located in a side of the end point for infinity Pi in relation to the central position Pc of lens movable range, FIG. 16 shows a case when the initial locating point Po is located in a side of the end point for the adjusted position of nearest focus Pn in relation to the central position Pc of lens movable range, and FIG. 17 shows a case when the initial locating point Po is located in a side of the end point for the adjusted position of nearest focus Pn in relation to the central position Pc of lens movable range and a case the adjusted position of final focus Pe is located between the initial locating point Po and the above mentioned the nearer end point.

For a method of this kind, in many cases it is arrange in usual case to have a criterion of peak judgment which is considerably severely settled in order to minimize occurrence of failed focus adjusting, and when an ambiguous result is obtained, to perform the whole range scanning. However, because the scanning range can be significantly narrowed as depicted in FIG. 17 which corresponds to a case depicted in FIG. 14 when in a case the peak is detected, time for scanning is dramatically reduced, thereby speeding up of automatic focus adjusting operation ca be realized.

As for speeding up method other than above described "counter direction scanning" and "interruption of scanning when peak is detected", a method can be thought that "immediately starting scan from the initial locating position Po" as disclosed in Japanese Patent Laid Open Publication No. Hei 05-241066. That is to say in Japanese Patent Laid Open No. Hei 05-241066, it is disclosed that in order to realize speeding up of automatic focus adjusting operation, focus adjusting scan is initiated from the initial locating position Po to an end point which is located nearer to the initial locating position Po and when any peak could not be found during the scan from the initial locating position Po to the nearer end point, then the focusing lens is moved back to the initial locating position Po and the focus adjusting operation is performed again this time toward the end point which is located farther. The concrete operation is depicted in FIG. 18, FIG. 19 and FIG. 20.

As shown in FIG. 18 to FIG. 20 when the operation for automatic focus adjusting is ordered, the first focus adjusting scan (depicted "scan 1") is performed from the initial locating position Po as the scan beginning point toward the end point selected from focus adjusted position for infinity Pi and the adjusted position of nearest focus Pn which is locating nearer to the initial locating position Po, moreover the focusing lens is moved back to the original initial locating position Po and then the second focus adjusting operation (depicted "scan 2") is performed from the initial locating position Po to the other end point which is locating farther from the initial locating position Po. By these scannings, peak position of the evaluating values for AF is detected as focus adjusted position in other words as the adjusted position of final focus Pe, then after the whole range scanning the focusing lens is set at the adjusted position of final focus Pe by a returning back operation thereby the automatic focus adjusting is completed FIG. 18 shows a case when the initial locating point Po is located in a side of the end point for infinity Pi in relation to the central position Pc of lens movable range, FIG. 19 shows a case when the initial locating point Po is located in a side of the end point for the adjusted position of nearest focus Pn in relation to the central position Pc of lens movable range, and FIG. 20 shows a case when the initial locating point Po is located in a side of the end point for the adjusted position of nearest focus Pn in relation to the central position Pc of lens movable range and FIG. 20 shows a case the adjusted position of final focus Pe is located between the initial locating point Po and the above mentioned the nearer end point.

In the case depicted in FIG. 20 the automatic focus adjusting operation is ordered and at the time point the first focus adjusting operation (scan 1) is completed from the initial locating position Po as the scan starting point to the end point which is locating nearer to the initial locating position Po from the both end points of the focusing lens movable range, when the peak or evaluating value for AF is detected the peak position is detected as the adjusted position of final focus without performing the second focus adjusting operation (scan 2) thereby the focusing lens is set to the adjusted position of final focus Pe by the moving back operation and the automatic focus adjusting operation has been completed.

By this method disclosed in the Japanese Patent Laid Open No. Hei 05-241066, because the moving operation to the scan starting point is eliminated, the speed up of automatic focus adjusting operation can be attained by just that much. Because the method disclosed in the Japanese Patent Laid Open Publication No. Hei 05-241066 which is depicted in FIG. 18 to FIG. 20, is adapted to the method depicted in FIG. 12 to FIG. 14, the operation of "interruption of scanning when peak is detected" is not considered, but it goes without saying that the operation of "interruption of scanning when peak is detected" can be introduced thereby much speeding up of the automatic focus adjusting operation can be attained.

However there are some problems in the operation "focus adjusting operation is initiated from the initial locating position Po" depicted in FIG. 18 to FIG. 20 based on the Japanese Patent Laid Open Publication No. Hei 05-241066. That is to say in this method as shown in especially in FIG. 18 and FIG. 19 because in this method the focusing lens is moved back to the initial locating position Po after the first scan has been performed from the initial locating position Po to one end point, the one part of focus adjusting scan in the focus adjusting operation becomes discontinuous. Accordingly this method has a problem that "is there any adverse effect to performance characteristics by one part of the focus adjusting scan becomes discontinuous?". In the matter of fact because the evaluating value for AF obtained time has a discrepancy at the discontinuing point of the focus adjusting scan, there is an anxiety that evaluating value for AF becomes also discontinuous, in addition because the directions of focus adjusting scan at the scan discontinued point are different, there is a possibility that the dependence of scanning direction may cause some adverse effect on the evaluating value for AF. In other words when the peak position and the scan discontinued point are almost located on the same position as shown in FIG. 21, there is a probability that accuracy for peak detection is decreased. To make matters worse not only overlapping between the sum discontinuing point and the initial locating position Po, but in many case the initial locating position Po also overlaps with the last focus adjusted position, because of this it has a problem that a discontinuity of focus adjusting scan occurs at a position which has the highest probability of focus adjusted position existence and thereby accuracy of peak detection is decreased in certain extent when the continuous photographing of the same object to be photographed is considered.

Further it can be thought that there is a high provability the focus adjusted position is located in the vicinity of the initial locating position Po when a continuous photographing of the same object to be photographed is considered, if a focus adjusted position which is located near to the initial locating position Po can be detected in the first scan (scan 1 depicted in FIG. 18 to FIG. 20), in high provability the second scan (scan 2 depicted in FIG. 18 to FIG. 20) need not to be performed. On the contrary, when the focus adjusting scan is initiated from the initial locating position PO, as shown in FIG. 22, for the object to be photographed which is locating in the vicinity of the initial locating position Po but which is apart from it in an opposite direction to the scanning direction, the object to be photographed is included inevitably in a range of the second scan (scan 2). The technology which is disclosed in the Japanese Patent Laid Open Publication No. Hei 05-241066 still has a kind of problem when it is thought from the above describe view point.

Still further in the technology which is disclosed in the Japanese Patent Laid Open Publication No. Hei 05-241066, undesirable situation is also caused by in a case when the initial locating position Po is located near to the end points of the scanning range. That is to say as shown in FIG. 23, an area of the first focus adjusting scan (scan 1) becomes too short, and because of this, even when a something like peak is located with in the scanning area, it is made too hard to discriminate the point as a peak. As a result of this fact, because the focus adjusting operation is moved inevitably to the second focus adjusting scan (scan 2), the effect of speeding up of automatic focus adjusting operation is lost and only decreasing of accuracy of focus adjusting operation caused by an existence of the scan discontinuous point, is remained. In other words a situation where only demerit is remaining, is introduced.

Accordingly when the above described situation is considered, typically the below described two points are required as problems to be solved.

(1) To achieve further speeding up with ensuring a high accuracy of focus adjusting operation in a ease when the same object to be photographed is continuously photographed. That is to say the high accuracy of focus adjusting operation is ensured by means that a vicinity of the initial locating position Po does not become the scan discontinuing point, and at the same time to realize a detection of focus adjusted position which has a high provability to be located near to the initial locating position Po at the first focus adjusting scan (scan 1) without fail.

(2) To maintain further high accuracy of focus adjusting by means of intending to make a focus adjusting sequence proper after a photographing around vicinity of the end point for infinity or the adjusted position of nearest focus. That is to say in a case when an enough strength of scan cannot be ensured to discriminate a peak position as the first focus adjusting scan (scan 1), it makes effective speeding up of automatic focus adjusting operation difficult. As a result of this fact, a structure in which a situation such as the above mentioned is avoided from a scanning sequence of the automatic focus adjusting operation.

SUMMARY OF THE INVENTION

In this regard the present invention is made in view of the above described situation and one object of the present invention is to provide camera, device for capturing object image, an automatic focus adjusting system and a method for adjusting automatic focus for the same, by which operations related to a focus adjusting scan are regulated to suppress a useless action, and efficiency and reliability of the focus adjusting scan can be effectively improved.

Another object of the present invention is to provide a camera by which operations related to a focus adjusting scan are regulated to suppress a useless action, and efficiency and reliability of the focus adjusting scan can be effectively improved when the focus adjusting is continuously performed again and again for the same object to be photographed in almost in the same situation.

Other object of the present invention is to provide a camera by which an efficiency of focus adjusting scan can be more highly improved.

Other object of the present invention is to provide a camera by which an efficiency of the focus adjusting scan can be further improved in a case when the initial locating position Po is located near to an end portion of range of the focus adjusting scan.

Still other object of the present invention is to provide a camera by which an efficiency of the focus adjusting scan and a reliability of focus adjusting operation can be further improved in a case when the object to be photographed is the same and corresponding to a level of provability that situation to photographing the same object to be photographed is resemble.

Still other object of the present invention is to provide a camera by which an efficiency of the focus adjusting scan and a reliability of focus adjusting operation can be further improved in a case when the object to be photographed is the same and more adequately corresponding to a level of provability that situation to photographing the same object to be photographed is resemble.

Still other object of the present invention is to provide a camera by which an efficiency of the focus adjusting scan and a reliability of focus adjusting can be further improved by means of adequate correspondence with a variation of focal distance of the optical system.

Another object of the present invention is to provide a device for capturing object image by which operations related to a focus adjusting scan are regulated to suppress a useless action, and efficiency and reliability of the focus adjusting scan can be effectively improved especially when the focus adjusting is continuously performed again and again for the same object to be photographed in almost in the same situation.

Other object of the present invention is to provide a device for capturing object image especially by which the efficiency of focus adjusting scan can be more highly improved.

Other object of the present invention is to provide a device for capturing object image by which an efficiency of the focus adjusting scan can be further improved in a case especially when the initial locating position Po is located near to an end portion of range of the focus adjusting scan.

Still other object of the present invention is to provide a device for capturing object image by which an efficiency of the focus adjusting scan and a reliability of focus adjusting can be further improved in a case especially when the object to be photographed is the same and corresponding to a level of provability that situation to photographing the same object to be photographed is resemble.

Still other object of the present invention is to provide a device for capturing object image by which an efficiency of the focus adjusting scan and a reliability of focus adjusting can be farther improved in a case especially when the object to be photographed is the same and more adequately corresponding to a level of provability that situation to photographing the same object to be photographed is resemble.

Still other object of the present invention is to provide a device for capturing object image especially as a various kind of apparatus.

Another object of the present invention is to provide an automatic focus adjusting system by which efficiency and reliability of the focus adjusting scan can be effectively improved especially when the focus adjusting is continuously performed again and again for the same object to be photographed in almost in the same situation.

Other object of the present invention is to provide an automatic focus adjusting system especially by which the efficiency of focus adjusting scan can be more highly improved.

Other object of the present invention is to provide an automatic focus adjusting system by which operations related to a focus adjusting scan are regulated to suppress a useless action, and efficiency of the focus adjusting scan can be further improved in a case especially when the initial locating position Po is located near to an end portion of range of the focus adjusting scan.

Still other object of the present invention is to provide an automatic focus adjusting system by which an efficiency of the focus adjusting scan and a reliability of focus adjusting can be further improved in a case especially when the object to be photographed is the same and corresponding to a level of provability that situation to photograph the same object to be photographed is resemble.

Still other object of the present invention is to provide an automatic focus adjusting system by which an efficiency of the focus adjusting scan and a reliability of focus adjusting can be further improved in a case especially when the object to be photographed is the same and more adequately corresponding to a level of provability that situation to photographing the same object to be photographed is resemble.

Another object of the present invention is to provide a method for adjusting automatic focus by which operations related to a focus adjusting scan are regulated to suppress a useless action, and efficiency and reliability of the focus adjusting scan can be effectively improved especially when the focus adjusting is continuously performed again and again for the same object to be photographed in almost in the same situation.

Other object of the present invention is to provide a method for adjusting automatic focus especially by which the efficiency of focus adjusting scan can be more highly improved.

Other object of the present invention is to provide a method for adjusting automatic focus by which an efficiency of the focus adjusting scan can be further improved in a case especially when the initial locating position Po is located near to an end portion of range of the focus adjusting scan.

To attain the above described object one example of the camera in accordance with the present invention is characterized by including a photographing optical system which forms image of an object to be photographed on an image forming surface; a means for capturing image to convert the image of the object to be photographed to image signal; a focus operating means to vary a focus adjusting state of the object image on the means for capturing image by moving at least any one of whole the photographing optical system, an optical means which is a portion of the photographing optical system and the means for capturing image along an optical axis direction; a focus adjusting evaluating value detecting means seeking evaluating value of focus adjusting which is indicative of focus adjusting state as a criterion from image data obtained by the means for capturing image; and a control means for adjusting focus which seeks a focus adjusted position where the focus adjusting evaluating value becomes a most appropriate value and drives the focus operating means to the focus adjusted position to perform a focus adjusting by scan in that the focus adjusting evaluating value detecting means is driven while the focus operating means is driven in at least any one of continuous way and intermittent way to obtain a plurality of the focus adjusting evaluating value; and in that the control means for adjusting focus includes a scan control means to set a scan starting point and a direction of the scan such that focus adjusting operation is initiated from a point that is shifted in a predetermined amount of distance in a predetermined direction from an initial locating position Po of the focus operating means toward an opposite direction to the predetermined direction.

The scan control means set in a direction going to an end which is located farther from the initial locating position Po between the both end points of a scanning range as the predetermined direction.

In another embodiment a camera in accordance with the present invention is characterized by including a photographing optical system which forms image of an object to be photographed on an image forming surface; a means for capturing image to convert the image of the object to be photographed to image signal; a focus operating means to vary a focus adjusting state of the object image on the means for capturing image by moving at least any one of whole the photographing optical system, an optical means which is a portion of the photographing optical system and the means for capturing image along an optical axis direction; a focus adjusting evaluating value detecting means seeking evaluating value of focus adjusting which is indicative of focus adjusting state as a criterion from image data obtained by the means for capturing image; and a control means for adjusting focus which seeks a focus adjusted position where the focus adjusting evaluating value becomes a most appropriate value and drives the focus operating means to the focus adjusted position to perform a focus adjusting by scan in that the focus adjusting evaluating value detecting means is driven while the focus operating means is driven in at least any one of continuous way and intermittent way to obtain a plurality of the focus adjusting evaluating value; in that the control means for adjusting focus includes an additional scan control means to set a scan starting point and a direction of the scan such that when in a case distance from an initial locating point of the focus operating means to an end point which is located nearer to the initial locating position Po between both end points of the focus adjusting scan range, is smaller than a second predetermined amount of distance, after the focusing lens is moved to the nearer end point, then the focus adjusting scan is initiated from the end point toward the other end point.

In an example the control means for adjusting focus includes any one of operation number discriminating means which discriminates whether the focus adjusting operation performed next is a first focus adjusting operation after the electric power is turned on or is a second or more focus adjusting operation, and operated result storing means which stores an operated result that designates whether a focus adjusted state is detected or not at the focus adjusting operation, and any one of first variable control means which controls to vary at least one of the first predetermined amount of distance and the second predetermined amount of distance according to a discriminated result by the operation number discriminating means, and second variable control means which controls to vary at least one of the first predetermined amount of distance and the second predetermined amount of distance on the basis of an operated result in the last focus adjusting operation that is stored in the operated result storing means.

In other example the control means for adjusting focus includes any one of evaluating value storing means which stores a final evaluating value of focus adjusting in the focus adjusting operation, and continuous evaluating value storing means which obtains continuously the evaluating value of focus adjusting and stores the value at all time when the power source of the device is turned on, and any one of third variable control means which controls to vary the first predetermined amount of distance according to a result of comparison between a final evaluating value of focus adjusting of the last focus adjusting operation that is stored in the evaluating value storing means and an evaluating value of focus adjusting when the present focus adjusting operation is started, and fourth variable control means which controls to vary the first predetermined amount of distance according to a time series alternating state of the evaluating value of focus adjusting that is stored in the continuous evaluating value storing means from a time point that the last focus adjusting operation is terminated to a time point that the present focus adjusting operation is started.

The photographing optical system is a variable focal distance optical system and at the same time includes a focal distance output means which outputs a focal distance information which is related to its focal distance, and the control means for adjusting focus includes a fifth variable control means which controls to vary at least one of the first predetermined amount of distance and the second predetermined amount of distance according to the focal distance information output from the focal distance output means.

A device for capturing object image in accordance with the present invention is characterized by including: a means for capturing image to obtain object image; a image data obtaining means to obtain object information according to the object image from the object image; a focus operating means which varies a focus adjusting state of object image obtained by the means for capturing image; a focus adjusting evaluating value detecting means which seeks an evaluating value of focus adjusting as a criterion of focus adjusting state from the image data obtained by the image data obtaining means; a control means for adjusting focus which seeks a focus adjusted position where the focus adjusting evaluating value becomes a most appropriate value and drives the focus operating means to the focus adjusted position to perform a focus adjusting by scan in that the focus adjusting evaluating value detecting means is driven while the focus operating means is driven in at least any one of continuous way and intermittent way to obtain a plurality of the focus adjusting evaluating value; in that the control means for adjusting focus includes a scan control means to set a scan starting point and a direction of the scan such that focus adjusting operation is initiated from a point that is shifted in a predetermined amount of distance in a predetermined direction from an initial locating position Po of the focus operating means toward an opposite direction to the predetermined direction.

At this point the scan control means set a direction going to an end which is located farther from the initial locating position Po between the both end points of a scanning range as the predetermined direction.

In another embodiment the device for capturing object image in accordance with the present invention is characterized by including: a means for capturing image to obtain object image; an image data obtaining means to obtain object information according to the object image from the object image; a focus operating means which varies a focus adjusting state of object image obtained by the means for capturing image; a focus adjusting evaluating value detecting means which seeks an evaluating value of focus adjusting as a criterion of focus adjusting state from the image data obtained by the image data obtaining means; a control means for adjusting focus which seeks a focus adjusted position where the focus adjusting evaluating value becomes a most appropriate value and drives the focus operating means to the focus adjusted position to perform a focus adjusting by scan in that the focus adjusting evaluating value detecting means is driven while the focus operating means is driven in at least any one of continuous way and intermittent way to obtain a plurality of the focus adjusting evaluating value; wherein the control means for adjusting focus includes an additional scan control means to set a scan starting point and a direction of the scan such that when in a case distance from an initial locating point of the focus operating means to an end point which is located nearer to the initial locating position Po between both end points of the focus adjusting scan range, is smaller than a second predetermined amount of distance, after the focusing lens is moved to the nearer end point, then the focus adjusting scan is initiated from the end point toward the other end point.

At this point the control means for adjusting focus includes at least any one of operation number discriminating means which discriminates whether the focus adjusting operation performed next is a first focus adjusting operation after the electric power is turned on or is a second or more focus adjusting operation, operated result storing means which stores an operated result that designates whether a focus adjusted state is detected or not at the focus adjusting operation, and focal distance output means which output a focal distance information related to its focal distance of the means for capturing image; and a first variable control means which controls to vary at least one of the first predetermined amount of distance and the second predetermined amount of distance according to at least one of discriminated result by the operation number discriminating means, an operated result in the last focus adjusting operation that is stored in the operated result storing means and the focal distance information by the focal distance output means.

Also the control means for adjusting focus includes any one of evaluating value storing means which stores a final evaluating value of focus adjusting in the focus adjusting operation, and continuous evaluating value storing means which obtains continuously the evaluating value of focus adjusting and stores the value at all time when the power source of the device is turned on, and a second variable control means which controls to vary the first predetermined amount of distance according to at least one of a result of comparison between a final evaluating value of focus adjusting of the last focus adjusting operation that is stored in the evaluating value storing means and an evaluating value of focus adjusting when the present focus adjusting operation is started, and a time series alternating state of the evaluating value of focus adjusting that is stored in the continuous evaluating value storing means from a time point that the last focus adjusting operation is terminated to a time point that the present focus adjusting operation is started.

In one embodiment the device for capturing object image is any one of a camera, an image input device including image scanner and copying machine, and an optical observing equipment including microscope, telescope, binoculars and endoscope.

In one embodiment an automatic focus adjusting system in accordance with the present invention is characterized by including: a focus operating means to vary a focus adjusting state of the object image; a focus adjusting evaluating value detecting means seeking evaluating value of focus adjusting which is indicative of focus adjusting state as a criterion from object to be photographed image data corresponding to the object image; and a control means for adjusting focus which seeks a focus adjusted position where the focus adjusting evaluating value becomes a most appropriate value and drives the focus operating means to the focus adjusted position to perform a focus adjusting by scan in that the focus adjusting evaluating value detecting means is driven while the focus operating means is driven in at least any one of continuous way and intermittent way to obtain a plurality of the focus adjusting evaluating value; in that the control means for adjusting focus includes a scan control means to set a scan starting point and a direction of the scan such that focus adjusting operation is initiated from a point that is shifted in a predetermined amount of distance in a predetermined direction from an initial locating position Po of the focus operating means toward an opposite direction to the predetermined direction.

At this point the scan control means set a direction going to an end which is located farther from the initial locating position Po between the both end points of a scanning range as the predetermined direction.

In another embodiment the automatic focus adjusting system in accordance with the present invention is characterized by including: a focus operating means to vary a focus adjusting state of the object image; a focus adjusting evaluating value detecting means seeking evaluating value of focus adjusting which is indicative of focus adjusting state as a criterion from object to be photographed image data corresponding to the object image; and a control means for adjusting focus which seeks a focus adjusted position where the focus adjusting evaluating value becomes a most appropriate value and drives the focus operating means to the focus adjusted position to perform a focus adjusting by scan in that the focus adjusting evaluating value detecting means is driven while the focus operating means is driven in at least any one of continuous way and intermittent way to obtain a plurality of the focus adjusting evaluating value; in that the control means for adjusting focus includes an additional scan control means to set a scan starting point and a direction of the scan such that when in a case distance from an initial locating point of the focus operating means to an end point which is located nearer to the initial locating position Po between both end points of the focus adjusting scan range, is smaller than a second predetermined amount of distance, after the focusing lens is moved to the nearer end point, then the focus adjusting scan is initiated from the end point toward the other end point.

At this point the control means for adjusting focus includes any one of operation number discriminating means which discriminates whether the focus adjusting operation performed next is a first focus adjusting operation after the electric power is turned on or is a second or more focus adjusting operation, operated result storing means which stores an operated result that designates whether a focus adjusted state is detected or not at the focus adjusting operation, and focal distance output means which output a focal distance information related to its focal distance of the means for capturing image; and a first variable control means which controls to vary at least one of the first predetermined amount of distance and the second predetermined amount of distance according to at least one of discriminated result by the operation number discriminating means, an operated result in the last focus adjusting operation that is stored in the operated result storing means and the focal distance information by the focal distance output means.

The control means for adjusting focus includes any one of evaluating value storing means which stores a final evaluating value of focus adjusting in the focus adjusting operation, and continuous evaluating value storing means which obtains continuously the evaluating value of focus adjusting and stores the value at all time when the power source of the device is turned on, and a second variable control means which controls to vary the first predetermined amount of distance according to at least one of a result of comparison between a final evaluating value of focus adjusting of the last focus adjusting operation that is stored in the evaluating value storing means and an evaluating value of focus adjusting when the present focus adjusting operation is started, and a time series alternating state of the evaluating value of focus adjusting that is stored in the continuous evaluating value storing means from a time point that the last focus adjusting operation is terminated to a time point that the present focus adjusting operation is started.

An method for adjusting automatic focus in accordance with the present invention is characterized by including steps of: varying a focus adjusting state of an object image; seeking evaluating value of focus adjusting which is indicative of focus adjusting state as a criterion from object image information according to the object image; and performing a focus adjusting at which the focus adjusting evaluating value becomes a most appropriate value by scan in that the focus adjusting state is varied in at least any one of continuous way and intermittent way to obtain a plurality of the focus adjusting evaluating value; in that the method further comprising steps of: scanning starting point setting step to shift a scan starting point in a first predetermined amount of distance in a predetermined direction from an initial locating position Po of the focus adjusting operation, and scanning initiating step to initiate the scan toward an opposite direction to the predetermined direction.

At this point the method further comprising step of setting a direction going to an end which is located farther from the initial locating position Po between the both end points of a scanning range as the predetermined direction.

In another embodiment the method for adjusting automatic focus in accordance with the present invention is characterized by including steps of: varying a focus adjusting state of an object image; seeking evaluating value of focus adjusting which is indicative of focus adjusting state as a criterion from object image information according to the object image; and performing a focus adjusting at which the focus adjusting evaluating value becomes a most appropriate value by scan in that the focus adjusting state is varied in at least any one of continuous way and intermittent way to obtain a plurality of the focus adjusting evaluating value; wherein the method further comprising steps of: scanning position discriminating step to judge if a distance from an initial locating point of the focus operating means to an end point which is located nearer to the initial locating position Po between both end points of the focus adjusting scan range, is smaller than a second predetermined amount of distance; scan starting point setting step to move the scan starting point to the nearer end point when in a case the distance from the initial locating point of the focus adjusting scan to the end point which is located nearer is shorter than the second predetermined amount of distance; and a scan initiating step to initiate the focus adjusting scan from the end point toward the other end point after the moving of the scan stating point has been completed.

In this respect the method for adjusting automatic focus in accordance with the present invention may have a constitution including at least any one of operation number discriminating step to discriminate whether the focus adjusting operation performed next is a first focus adjusting operation after the electric power is turned on or is a second or more focus adjusting operation; operated result storing step to store an operated result that designates whether a focus adjusted state is detected or not at the focus adjusting operation, and focal distance detecting step to output a focal distance information related to its focal distance of the means for capturing image; and a step which controls to vary at least one of the first predetermined amount of distance and the second predetermined amount of distance according to at least one of discriminated result by the operation number discriminating means, an operated result in the last focus adjusting operation that is stored by the operated result storing step and the focal distance information by the above mentioned focal distance detecting step.

Also the method for adjusting automatic focus in accordance with the present invention may have a constitution including any one of evaluating value storing step which stores a final evaluating value of focus adjusting in the focus adjusting operation, and continuous evaluating value storing step which obtains continuously the evaluating value of focus adjusting and stores the value at all time when the power source of the device is turned on, and variable control step which controls to vary the first predetermined amount of distance according to at least one of a result of comparison between a final evaluating value of focus adjusting of the last focus adjusting operation that is stored by the evaluating value storing step and an evaluating value of focus adjusting when the present focus adjusting operation is started, and a time series alternating state of the evaluating value of focus adjusting that is stored by the continuous evaluating value storing step from a time point that the last focus adjusting operation is terminated to a time point that the present focus adjusting operation is started;

In this respect the method for adjusting automatic focus in accordance with the present invention may be made to include at least any one of operation number discriminating step which discriminates whether the focus adjusting operation performed next is a first focus adjusting operation after the electric power is turned on or is a second or more focus adjusting operation, operated result storing step which stores an operated result that designates whether a focus adjusted state is detected or not at the focus adjusting operation, and focal distance detecting step which obtain a focal distance information related to its focal distance of the means for capturing image; and a step which controls to vary at least one of the first predetermined amount of distance and the second predetermined amount of distance according to at least one of discriminated result by the operation number discriminating step, an operated result in the last focus adjusting operation that is stored by the operated result storing step and the focal distance information by the focal distance detecting step.

By this arrangement it can be realized that the efficiency of the focus adjusting scan and a reliability of the focus adjusting operation are further increased corresponding to a level of probability of the same situation especially when the same object to be photographed is continuously photographed.

In this respect the method for adjusting automatic focus in accordance with the present invention may be made to include at least one of evaluating value storing step which stores a final evaluating value of focus adjusting in the focus adjusting operation, and continuous evaluating value storing step which obtains continuously the evaluating value of focus adjusting and stores the value at all time when the power source of the device is turned on, and a step which controls to vary the first predetermined amount of distance according to at least one of a result of comparison between a final evaluating value of focus adjusting of the last focus adjusting operation that is stored by the evaluating value storing step and an evaluating value of focus adjusting when the present focus adjusting operation is started, and a time series alternating state of the evaluating value of focus adjusting that is stored by the continuous evaluating value storing step from a time point that the last focus adjusting operation is terminated to a time point that the present focus adjusting operation is started.

By this arrangement it can be realized that the efficiency of the focus adjusting scan and a reliability of the focus adjusting operation are further increased more adequately corresponding to a level of probability of the same situation especially when the same object to be photographed is continuously photographed.

BRIEF DESCRIPTION OF THE DRAWINGS

FIG. 8 is a flow chart to show one part of a control flow for the focus adjusting operation of digital camera shown in FIG. 1.

FIG. 14 is a schematic diagram to show an operation of focus adjusting in a third state of the digital camera in the prior art technology depicted in FIG. 12.

FIG. 15 is a schematic diagram to show an operation of focus adjusting in a first state of a second digital camera in the prior art technology in which speeding up is realized.

DETAILED DESCRIPTION OF THE PREFERRED EMBODIMENTS

Hereinafter detailed explanation will be given on camera, a device for capturing object image, an automatic focus adjusting system and a method for adjusting automatic focus in accordance with the present invention on basis of embodiment with reference to the accompanying drawings.

Figure 1:
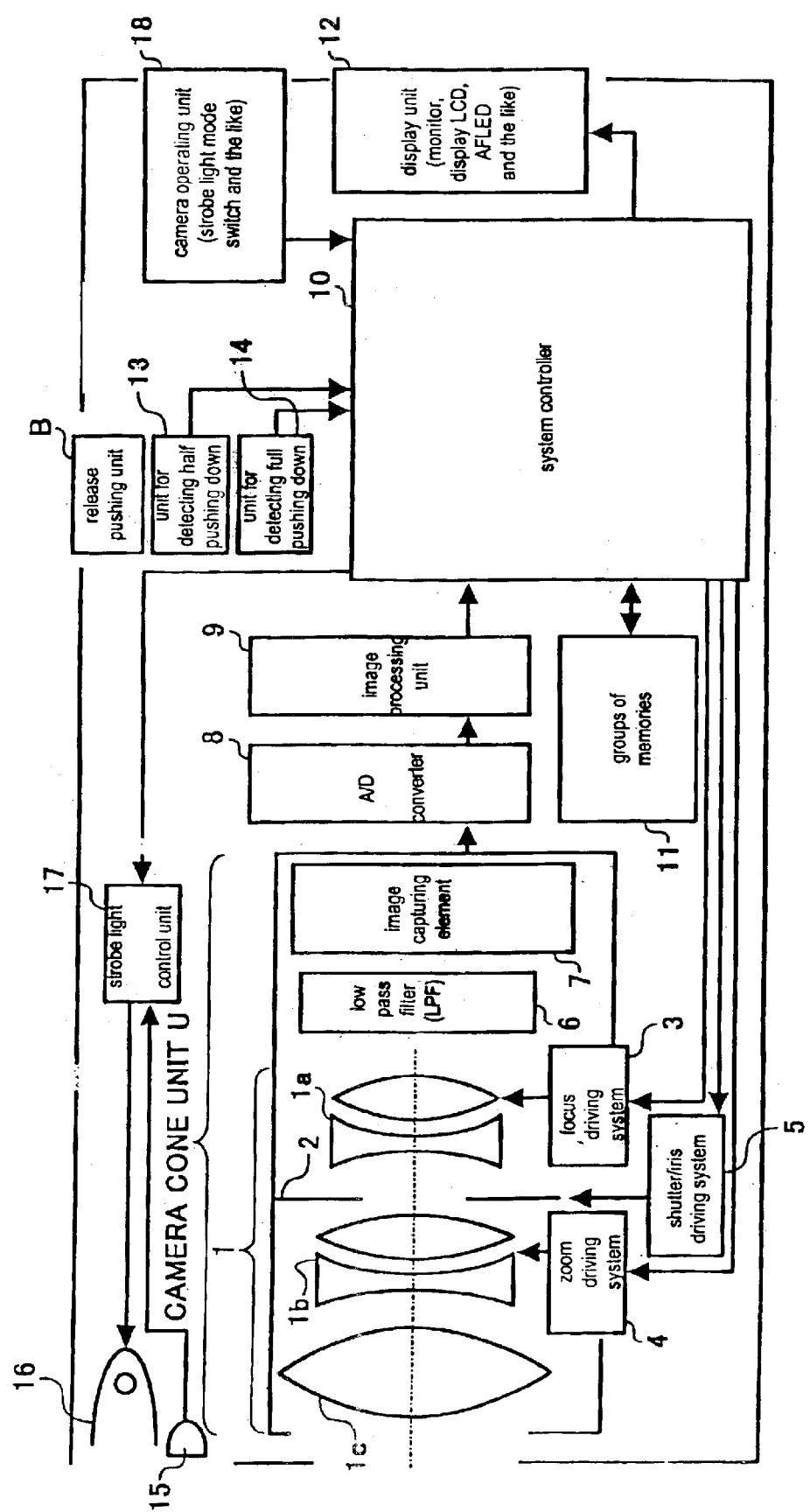
FIG. 1 is a block diagram to schematically show a constitution of digital camera in accordance with one embodiment of the present invention.
Figure 2:
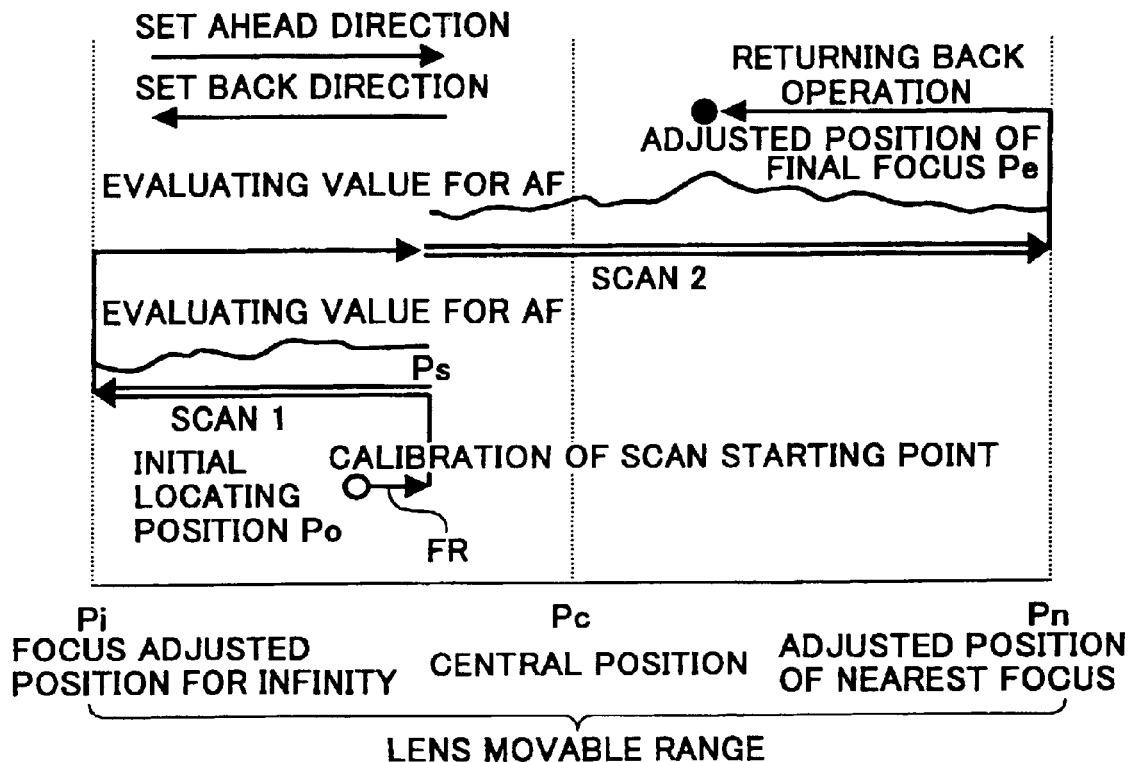
FIG. 2 is a schematic diagram to show an operation of focus adjusting in a first state of the digital camera shown in FIG. 1.
Figure 3:
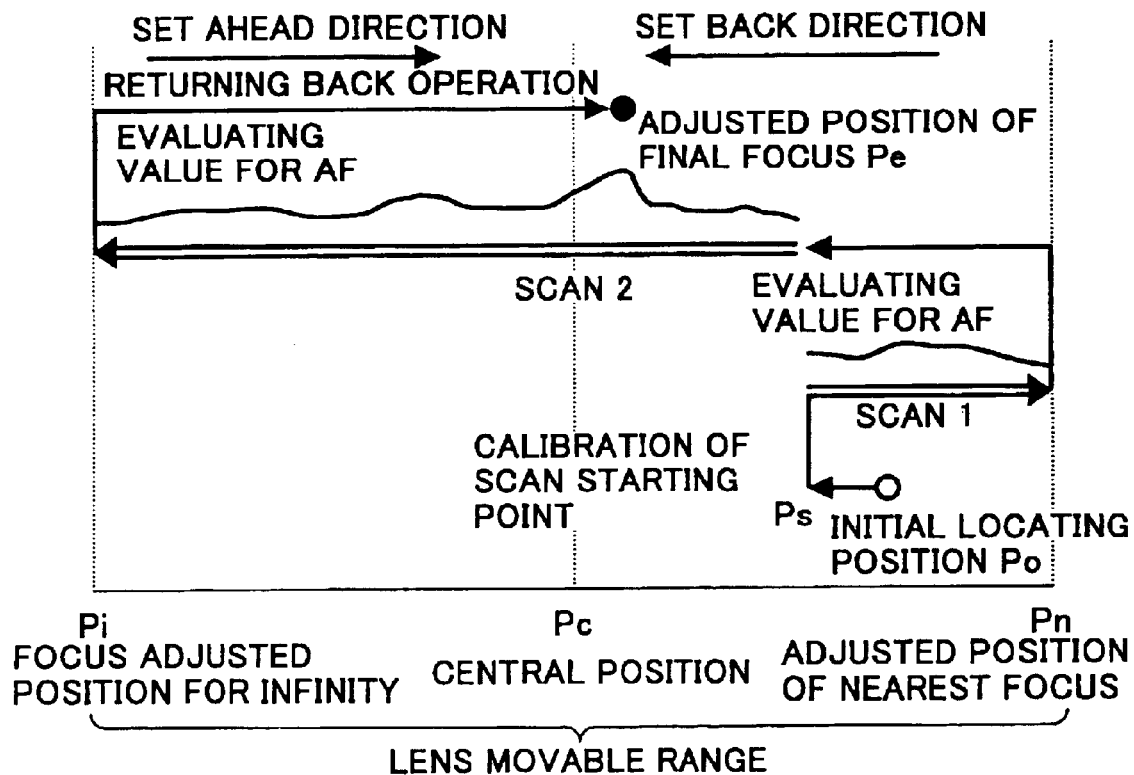
FIG. 3 is a schematic diagram to show an operation of focus adjusting in a second state of the digital camera shown in FIG. 1.
Figure 4:
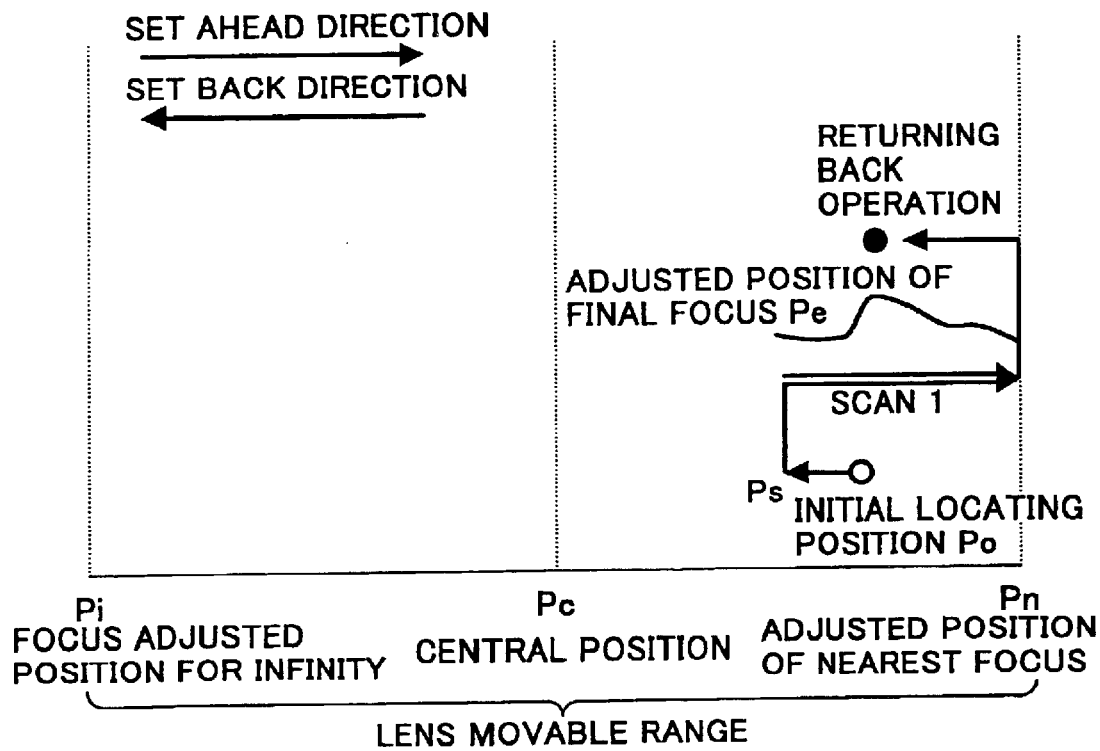
FIG. 4 is a schematic diagram to show an operation of focus adjusting in a third state of the digital camera shown in FIG. 1.

A camera depicted in FIG. 1 includes an optical system 1, a shutter/iris unit 2, a focus driving system 3, a zoom driving system 4, a shutter/iris driving unit 5, a low pass filter (LPF) 6, an image capturing element 7, an A/D (analog-digital) converter 8, an image processing unit 9, a system controller 10, a group of memories 11, a display unit 12, a unit for detecting half pushing down 13, a unit for detecting full pushing down 14, a light receiving unit 15, a strobe light radiating unit 16, a strobe light control unit 17, a camera operating unit 18 and a release button pushing unit 19.

In FIG. 1 light from an object to be photographed is brought into the optical system 1 as a photographing optical system. The optical system 1 includes a focusing lens (a group of focusing lenses) 1a which performs a focus adjusting for the object to be photographed by means of a reciprocal movement along a optical axis, that is to say, it performs a focus adjusting movement for focus adjusting operation, a zooming lens (a group of zooming lenses) 1b which performs an expanding/shrinking operation for the object image to adjust a focal length of the optical system 1 by means of reciprocal movement along the optical axis, and an objective lens 1c which performs a forming operation for the object image by means of cooperational work with the focusing lens 1a and the zooming lens 1b. The shutter/iris unit 2 is arranged between the focusing lens 1a and the zooming lens 1b, and by this shutter/iris unit 2 amount of the incident light to the focusing lens 1a is regulated. The focusing lens 1a is driven by the focus driving system 3 as a focusing operation driving means, the zooming lens 1b is driven by the zoom driving system 4, and the shutter/iris unit 2 is driven by the shutter/iris driving unit 5, respectively.

Light from object to be photographed which passes through the optical system 1, is brought to incident to the image capturing element 7 as an means for capturing image via the low pass filter 6 which removes high frequency component of the light. The image capturing element 7 includes an image capturing plane in which a plurality of photoelectric converting element are arranged in a form of two dimensional matrix, to convert an object image that is brought into and formed onto the image capturing plane based on an image of the object to be photographed into image data composed by electric signals, and outputs the signals.

The above described optical system 1 which includes the focusing lens 1a, the zooming lens 1b and the objective lens 1c, is constituted a camera cone unit U with the shutter/iris unit 2, the low pass filter 6 and the image capturing element 7.

The image data which is output from the image capturing element 7, are converted into digital values by the A/D converter 8, then they are input to the image processing unit 9. The image processing unit 9 performs a predetermined required image processing such as expanding/shrinking process, alteration of image resolution and the like on the input image data.

The system controller 10 is arranged to perform a control for the whole digital camera, and includes CPU (central processing unit) which is composed of a micro processor and the like that performs various kind of calculating process according to predetermined program, ROM (read only memory) which is composed of read only semiconductor memories and the like that stores processing program and so on for CPU, RAM (random access memory) which is composed of read/write semiconductor memories and the like having working area that is utilized on the various kind of processes by CPU, data storing area that stores various kind of data and so on. And to the system controller 10, the above described focus driving system 3, zoom driving system 4 and shutter/iris driving unit 5, a group of memories 11 which includes memories to store the image data that are obtained by the image processing unit 9 and the like, and the display unit 12 which includes a monitor such as liquid crystal display to display the above described image data, a display liquid crystal display (display LCD) to display various kind of information in relation to photographing, an AF light emitting diode (AFLED) to inform a result of focus adjusting by the automatic focus adjusting operation, and the like are connected. The system controller 10 controls the respective units which are connected to itself.

Also in this digital camera there is provided a release button pushing unit B such as releasing button with two step operation and the like, it is arranged to give a command for the object image adjusting operation such as the automatic focus adjusting when the release pushing unit B is put by an operator into a first step of the operation, that is to say, a half pushing operation, and to give a command for photographing of the object image when the release pushing unit B is put into a second step of the operation, that is to say, a full pushing operation. In other words this digital camera includes the unit for detecting half pushing down 13 which detects the half pushing operation of release pushing unit B and unit for detecting full pushing down 14 which detects the full pushing operation of release pushing unit B, and these unit for detecting half pushing down 13 and unit for detecting full pushing down 14 are connected to the system controller 10.

Further, this digital camera includes the light receiving unit 15 which measures a brightness of the object, the strobe light radiating unit 16 which irradiates an illumination light to the object to be photographed and the strobe light control unit 17 which performs a light emission control for the strobe light radiating unit 16 on the basis of brightness that is measured by the light receiving unit 15, and the strobe control unit 17 performs a control of light emission for the strobe light radiating unit 16 on the basis of a control and a direction for strobe light emission from the system controller 10. More further in the digital camera there is provided a camera operating unit 18 for setting a photographing operation by a manual operation of the operator such as strobe light mode switch which sets a strobe light emission mode, and so on, and the system controller 10 performs various kind of setting of the photographing operation on the basis of handling at the camera operating unit 18.

The digital camera depicted in FIG. 1 has not special structure in the basic constitution itself, and it is quite as the same as conventional digital cameras which are sold in the market. An automatic focus adjusting function in accordance with the present invention is performed as below described. When the half pushing operation of release pushing unit B is detected by the half pushing detecting unit 13, the system controller 10 responds to it, and drives continuously or intermittently or in a combination state of these two appropriately the focusing lens 1a of optical system 1 via the focus driving system 3, and the focus adjusting scan is achieved to seek evaluating value for AF on the basis of image data which are obtained by the image capturing element 7 through the A/D converter 8 and the image processing unit 9.

At this point the system controller 10 includes an evaluating value of focus adjusting detecting means which seeks an evaluating value of focus adjusting as a criterion of focus adjusting state from the image data obtained by the image capturing element 7, a control means for adjusting focus which seeks a focus adjusted position where the evaluating value of focus adjusting becomes a most appropriate value by means of scanning to gain a plurality of the evaluating value of focus adjusting and operating the above mentioned evaluating value of focus adjusting detecting means while driving the focusing lens 1a through the focus driving system 3, and which drives the focusing lens 1a to the above mentioned focus adjusted position to perform the focus adjusting operation. At the same time in addition to a function of the above described control means for adjusting focus, this controller has respective functions including a scanning control means which set the scan starting point and the scanning direction of the above mentioned scan such that the scanning is began from a point which is apart in a first predetermined amount of distance in a predetermined direction from the initial locating point of the focusing lens 1a toward a direction which is contrary to the predetermined direction, an additional scan control means which set the scan starting point and the scanning direction of the above mentioned scan such that after the focusing lens is moved to a nearer end point of the scanning range, the scanning is begun from the end point to the other end point when a distance from the initial locating point of focusing lens 1a to the above mentioned nearer end points is shorter than a second predetermined amount of distance, an operation number discriminating means which discriminates whether the focus adjusting operation performed next is a first focus adjusting operation after the electric power is turned on or is a second or more focus adjusting operation, an operated result storing means which stores an operated result that designates whether a focus adjusted state is detected or not at the above mentioned focus adjusting operation, an evaluating value storing means which stores a final evaluating value of focus adjusting in the above mentioned focus adjusting operation, a continuous evaluating value storing means which obtains continuously the evaluating value of focus adjusting and stores the value at all time when the power source of the device is turned on, a first variable control means which controls to vary at least one of the above mentioned first predetermined amount of distance and the second predetermined amount of distance according to a discriminated result by the above mentioned operation number discriminating means, a second variable control means which controls to vary at least one of the above mentioned first predetermined amount of distance and the second predetermined amount of distance on the basis of an operated result in the last focus adjusting operation that is stored in the above mentioned operated result storing means, a third variable control means which controls to vary the above mentioned first predetermined amount of distance according to a result of comparison between a final evaluating value of focus adjusting of the last focus adjusting operation that is stored in the above mentioned evaluating value storing means and an evaluating value of focus adjusting when the present focus adjusting operation is started, a fourth variable control means which controls to vary the above mentioned first predetermined amount of distance according to a time series alternating state of the evaluating value of focus adjusting that is stored in the above mentioned continuous evaluating value storing means from a time point that the last focus adjusting operation is terminated to a time point that the present focus adjusting operation is started, a fifth variable control means which controls to vary at least one of the above mentioned first predetermined amount of distance and the second predetermined amount of distance according to a focal distance information of the optical system 1, and the like.

Next hereinafter a solution in accordance with this embodiment for a problem to which a solution has been required, will be described with reference to schematic diagrams of the automatic focus adjusting operation depicted in FIG. 2 to FIG. 7.

Figure 5:
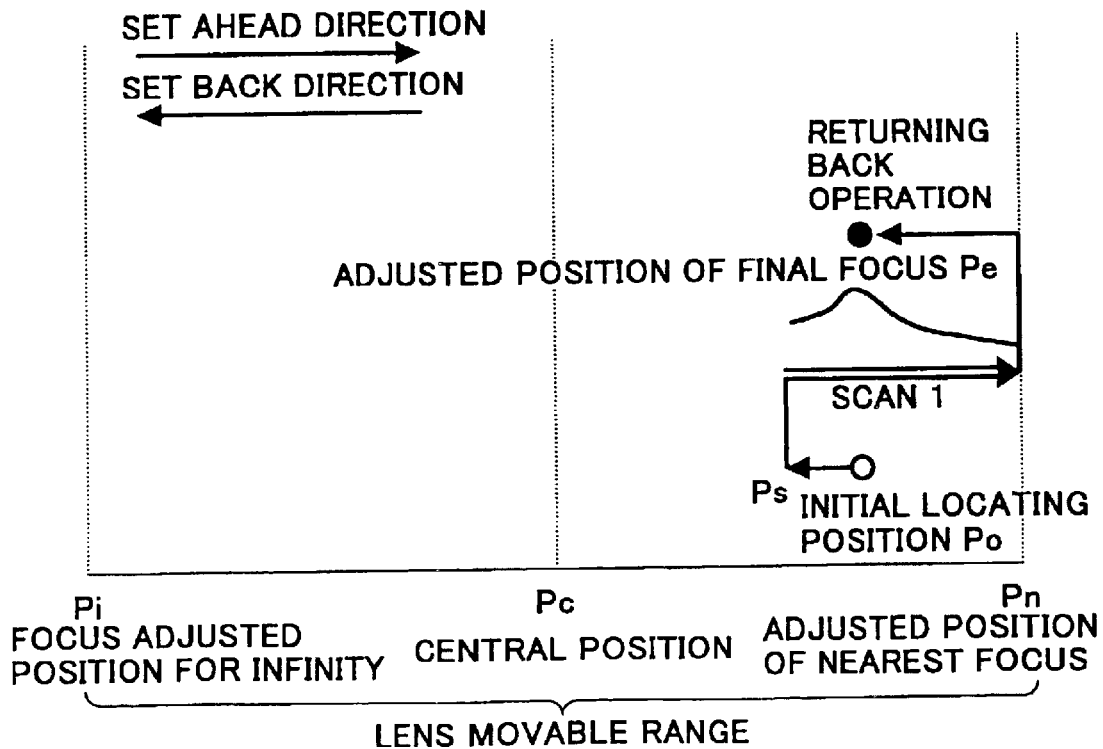
FIG. 5 is a schematic diagram to show an operation of focus adjusting in a fourth state of the digital camera shown in FIG. 1.
Figure 6:
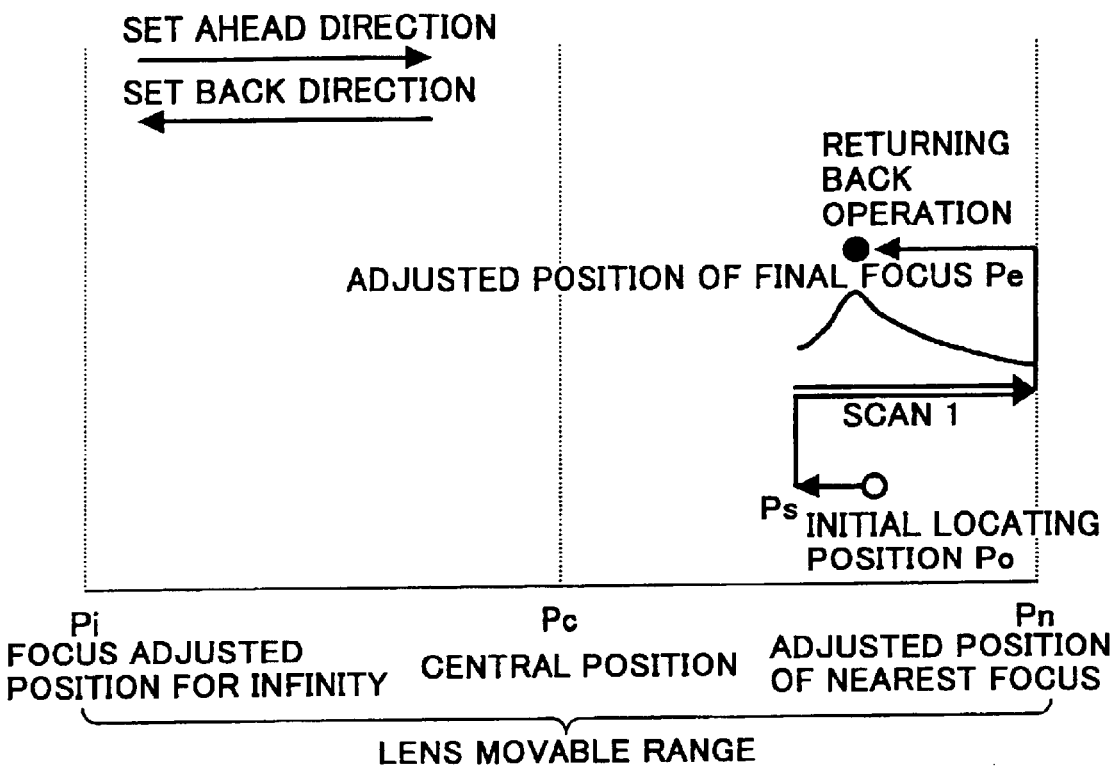
FIG. 6 is a schematic diagram to show an operation of focus adjusting in a fifth state of the digital camera shown in FIG. 1.

At first in this embodiment a device is made to pass an initial locating point Po at a first scanning (scan 1) by means that a calibrated position which is shifted from the initial locating point Po in an opposite direction to which a focus adjusting scan is performed, is selected as a scan starting point Ps as shown in FIG. 2 to FIG. 7. By this arrangement an accuracy of focus adjusting near the initial location position Po is not deteriorated even in a case when the initial locating position Po is located almost on the same point with the focus adjusted position Pe because the scan around the initial locating point Po is always made continuous as shown in FIG. 5 and FIG. 6. In addition it is made possible to detect the focus adjusted position in the first focus adjusting scan (scan 1) even in a case when a distance from an object to be photographed is slightly varied from a focus adjusted position in the last focus adjusting operation, an epoch making speeding up in the automatic focus adjusting can be realized in a continuous photographing for the same object to be photographed (See FIG. 5 and FIG. 6). It is the first predetermined amount of distance that an amount of shifted distance (Po' Ps) for a calibration of the starting point, and hereinafter in this specification this is refereed to as "amount of focus back Fr".

When the amount of focus back Fr is taken bigger, a possibility is made higher that the focus adjusted position located near by the initial locating point can be detected at the first focus adjusting scan, however, a returning back time for the amount of focus back Fr becomes longer by just that much, because it means that the speeding up of the automatic focus adjusting goes adversely, it is important that an appropriate amount of focus back Fr is set. An explanation on such setting of the appropriate amount of focus back Fr will be described later.

Next about a scanning direction for the first focus adjusting scan (scan 1), it can be thoughtable a scanning method in that the first scanning is performed always in the same direction, and a scanning method in that both scannings toward the end point for infinity and the end point for the adjusted position of nearest focus, are properly used depending upon conditions. Especially in a case that the dependence of evaluating value for AF on scanning direction is in a significant level and it can not be compensated easily, it is forced that the scanning direction is specified only in one direction. On the contrarily, when in a case that the dependence of evaluating value for AF on scanning direction is in a level that it can be compensated easily, when the scanning direction of the starting position calibration by amount of focus back Fr is set such that the first scanning for focus adjusting scan (scan 1) is specified in a direction toward the end point which is located nearer, because a returning back amount for a starting point of a second focus adjusting scan (scan 2) after the first focus adjusting scan (scan 1) can be minimized, it becomes slightly advantageous in a speeding up of the automatic focus adjusting operation almost the same as a case that is disclosed in the Japanese Patent Laid Open Publication No. Hei 05-241066 patent gazette depicted in FIG. 18 to FIG. 23.

Further when it is premised that a device is arranged for a method by which a peak judgment is performed for data obtained within the first focus adjusting scan (scan 1) after the first focus adjusting scan (scan 1) is completed, and if a detection of peak is attained, thereby a second focus adjusting scan (scan 2) is omitted, it contributes for speeding up of automatic focus adjusting operation that the first focus adjusting scan (scan 1) is initiated toward the end point which is located nearer when the focus adjusted position is included within the first focus adjusting scan (scan 1)

because a proportion of the first focus adjusting scan (scan 1) becomes smaller in relation to a whole scan.

And it is easily resulted that "the scan starting point is moved to one of the end points and the scan is initiated toward the other end point when in a case that it can be forecasted that it is useless to divide the scan into the first and second scan."

Figure 7:
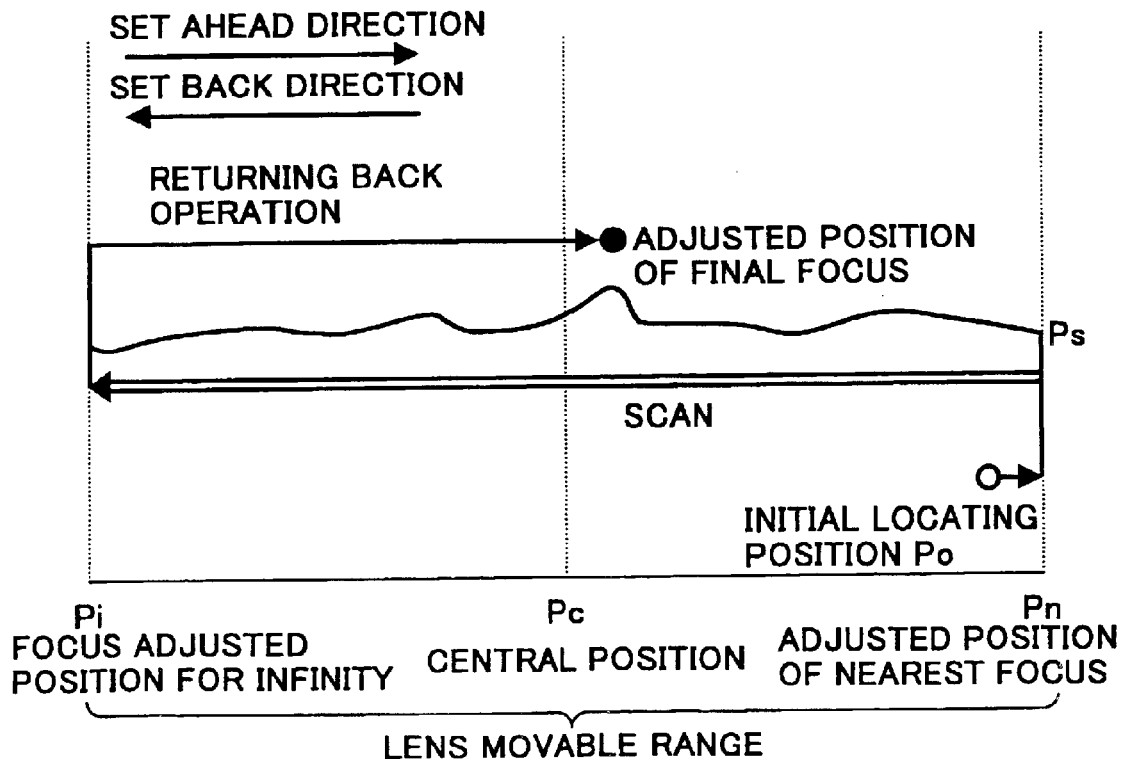
FIG. 7 is a schematic diagram to show an operation of focus adjusting in a sixth state of the digital camera shown in FIG. 1.

To be more precise when in a case that a distance (Fs) from the initial locating position Po to an end point located nearer is shorter than a predetermined value (Fs1) as a second predetermined value, a sequence is utilized such that simply the focusing lens is moved to the end point located nearer and then focus adjusting scan is initiated toward the other end point as depicted in FIG. 7, without trying a scan initiated from an position on the way within the whole scanning range other than both end points.

By this arrangement in a case when it is anticipated that there is no merit for speeding up by discontinuous divided scans, a continuous whole range scan which is much reliable is achieved and probability for an occurrence of situation in which an accuracy of focus adjusting operation is made a sacrifice, can be decreased.

Hereinafter a setting of above described the amount of focus back (Fr) as the first predetermined value will be described.

As already described above the present method of focus adjusting operation in which an area nearby the initial locating position Po is scanned through the starting point calibration by means of amount of focus back, displays its greatest effort when the same object to be photographed is continuously taken picture. On the contrary there may be a case happens that a sequence had better be changed because it does not carry much effect when a first shot is taken just after the electric power is turned on (in rigorous meaning not a first shot but if the focus adjusting operation is the first one or not). That is to say it is usual that the focusing lens just after the electric power is turned on is moved to a position where "pan focus" is realized (pan focus is a focal state having an object distance in which many of object generally photographed are existing, and usually an iris is narrowed as narrow as possible so that a depth of field is made deeper and thereby more object to be photographed can be included within the depth of field). And in this situation even an area which is near to the pan focus area is firstly scanned by means of release operation, a probability of a judgment being made that the focus adjusted position is existing within the area, is not so high.

Some countermeasure for this kind of situation can be conceivable as corrective action. As a first method the focus adjusting scan is simply initiated from one of the end points of scanning range at a first shot just after the electric power is turned on, and it is realized by that the above mentioned predetermined value Fs1 as the second predetermined value is made larger at a first shot just after the electric power is turned on. Another one is a method in that under a forecasting that it is in an area around the pan focus position whose probability of existence is high even at a first shot just after the electric power is turned on, the amount of focus back Fr (first predetermined value) is set in relatively high level from and after a second shot. The former is advantageous in a camera which has comparatively a longer adjusted position of nearest focus (for example, a capable photographing distance 80 cm–∞) and the latter is advantageous in a camera which has comparatively a shorter adjusted position of nearest focus (for example a capable photographing distance 30 cm–∞). This is because a situation where photographing in about an area 30 cm is quite rare in actual for usual users though its camera has a probability of photographing around 30 cm, accordingly in a case not from the nearest end point but from a specific point which is defined by such as a returning operation with predetermined amount of focus from the pan focus point, a scanning is initiated, probability of automatic focus adjusting operation completed in shorter time, becomes higher.

By these methods it is made possible to achieve more appropriate AF operation even at a first shot just after the electric power is turned on.

As is the case with above, even in or after a second shot in cases that a result of automatic focus adjusting operation of the last operation cannot be so credible, or an object to be photographed obviously moved largely, it is expected surely that more speeding up of automatic focus adjusting operation and more improvement in accuracy can be realized by means that at least any one of amount of focus back Fr and the judgment value Fs1 which designates whether a scan is initiated from the end point, are properly reset.

At this point firstly a consideration about a case that "the result of last automatic focus adjusting operation is fail (AFNG)" will be given. It is general that the focusing lens is driven unavoidably to the pan focus position in a case when no peak has been found as a result of focus adjusting scan, however, also in this case the probability for the object to be photographed to exist near around this area is not so high the same as above described cases. Accordingly it is preferable to perform focus adjusting scan simply initiated from the end point or to set the amount of focus back Fr in a larger level. By these arrangement it is expected that more appropriate automatic focus adjusting operation can be performed even after the last focus adjusting operation was fail.

Next a consideration will be given about a method in which a judgment "whether it is a continuous photographing of the same object to be photographed" is aggressively performed and the amount of focus back (Fr) is set on the basis of its result. For example, the last evaluating value for AF when the last focus adjusting operation has been completed, is stored and compared with an evaluating value for AF just before this automatic focus adjusting operation is performed, and when they are almost the same, a supposition is made that the object to be photographed has not varied, and the amount of focus back is set smaller thereby quite proximate area of the initial locating position can be made to scan at first. On the other hand when both evaluating value for AF are quite different the probability which the focused point is located near by the last focused position, thereby it is efficient that the amount of focus back is set "0". In this case it is also efficient that the amount of focus back Fr is set larger (instead of 0) in some cases.

As a more sophisticated method, it is possible to make judgment that the object to be photographed is varied when the evaluating value for AF is continuously captured and even only once a large change of the value has been detected. In any method of these, it is possible that a degree of change in the object to be photographed is judged stepwise by means of a degree of evaluating value for AF difference and a scale of variation, thereby the amount of amount of focus back can be set precisely, by these arrangement the most appropriate automatic focus adjusting operation viewed from point of accuracy and speed, can be performed according to their situation. In this respect a method in which "in a case when it can be judged that the object to be photographed does not varied, automatic focus adjusting operation is not achieved" is also an effective method for speeding up, however, there inevitably persists a problem that slight discrepancy of focus occurs, it appears in a major cases that even in narrow area the focus adjusting operation is performed as this embodiment of the present invention, is more preferable than the above described not achieved method viewed from a point of maintaining accuracy of automatic focus adjusting operation.

It is also meaningful that at least one of the above mentioned values Fr and Fs1 which designate two predetermined values, is finely adjusted. That is to say as for wide lens (Wide: wide angle—pan focus) and tele lens (Tele: telephotographic—long focus), the wide lens has a shorter time of focus adjusting scan because wide lens has a shorter focus driving range than the tele lens. Accordingly there is no necessity to consider the speeding up of focus adjusting operation as the most important matter in a wide lens part, thereby it is more effective that the values are changed to maintain an accuracy of the focus adjusting operation from view point of giving more importance to accuracy. For example, it is preferable that a method is set in many cases for initiating focus adjusting operation from any one of both end points of the focus adjusting scan with a setting the value Fs1 in a large level in order not to occur a discontinuing point at the focus adjusting scan in a wide lens part. By this arrangement it is made possible to realize automatic focus adjusting operation in which accuracy and speed are balanced according to its zooming position. At this point as for a zooming information detecting means, in other words focal distance output means to detect and to output focal distance information of the optical system, it may be a means which detects output value at respective zooming positions by utilizing a resistance plate and the like that is aligned in relation to the optical system 1, or it may be a means which detects mechanically one output value at a reference point within the zooming area and counts motor pulses to relatively detect output values for other points.

Hereinafter one example of objective process in accordance with the above described embodiment will be explained with reference to flow charts depicted in FIG. 8 and FIG. 9. A control process shown in this flow chart is performed mainly in the system controller 10. At this point in these flow chart the method to judge a variation of the object to be photographed by a comparison with the last evaluating value for AF, and a method of controlling at least one of values Fr and Fs1 which designate above mentioned two predetermined values utilizing zooming position detecting information, are not reflected.

Figure 9B:
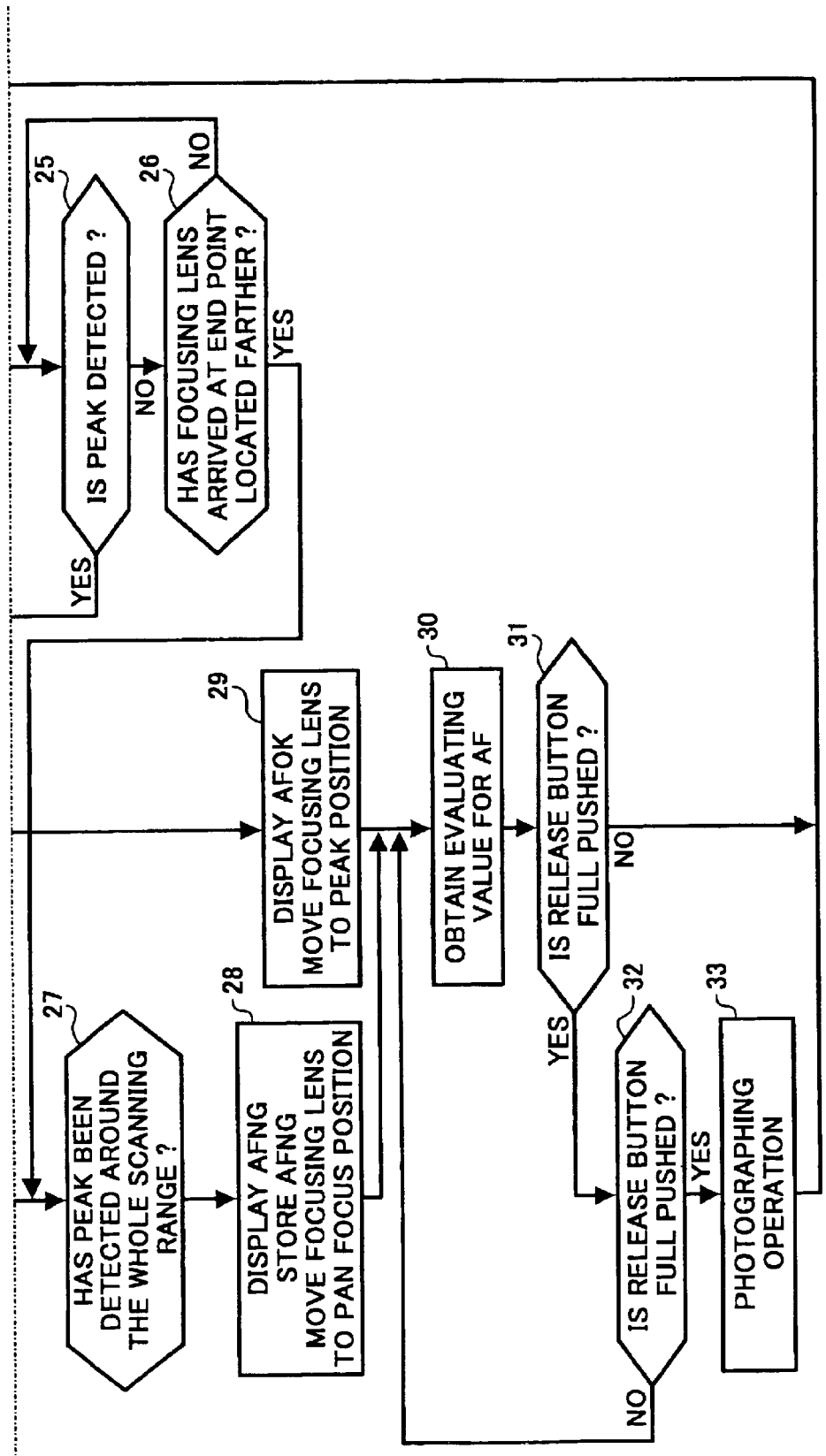
FIG. 9 is a flow chart to show remained part of control flow for the focus adjusting operation of digital camera shown in FIG. 1.
Figure 10:
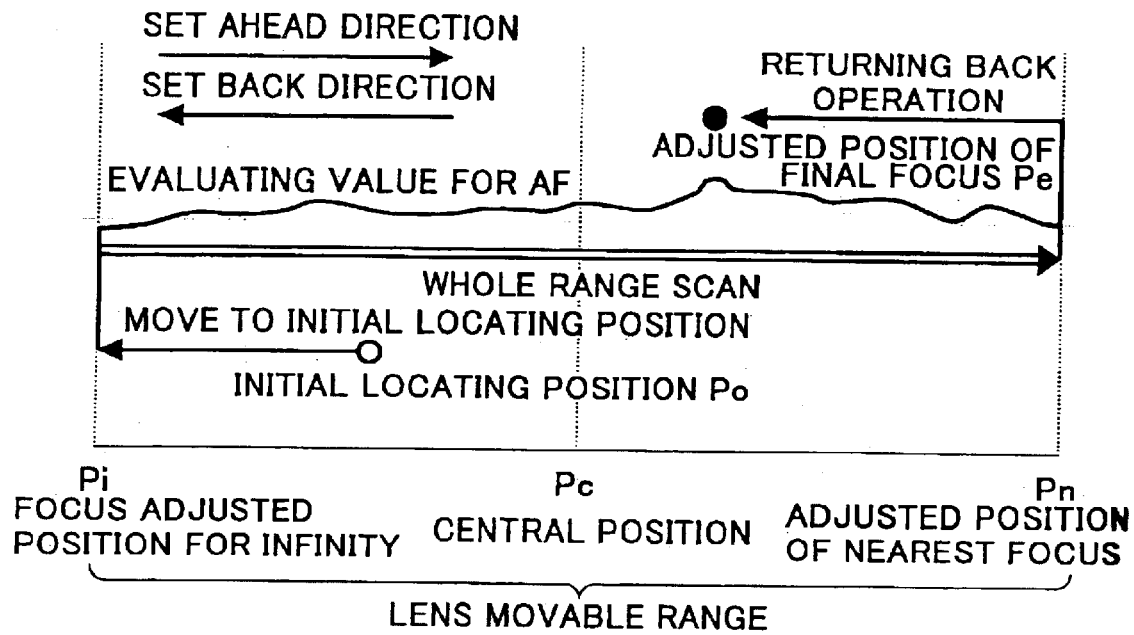
FIG. 10 is a schematic diagram to show an operation of focus adjusting in a first state of the digital camera which is a fundamental digital camera in the prior art technology.
Figure 11:
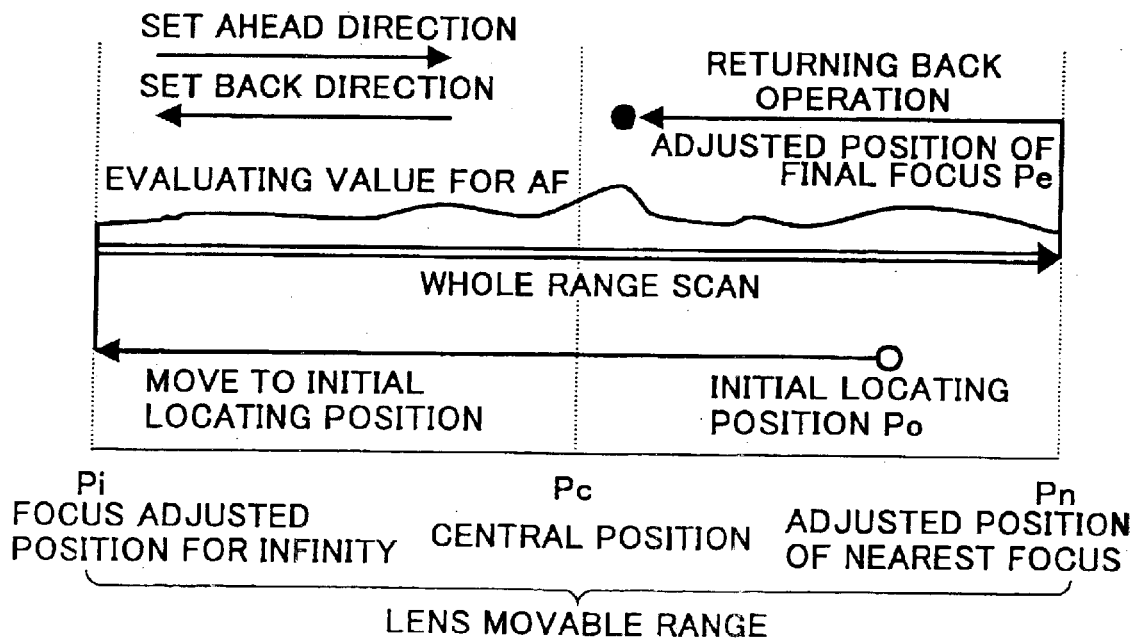
FIG. 11 is a schematic diagram to show an operation of focus adjusting in a second state of the digital camera which is a fundamental digital camera the same as that of shown in FIG. 10.
Figure 12:
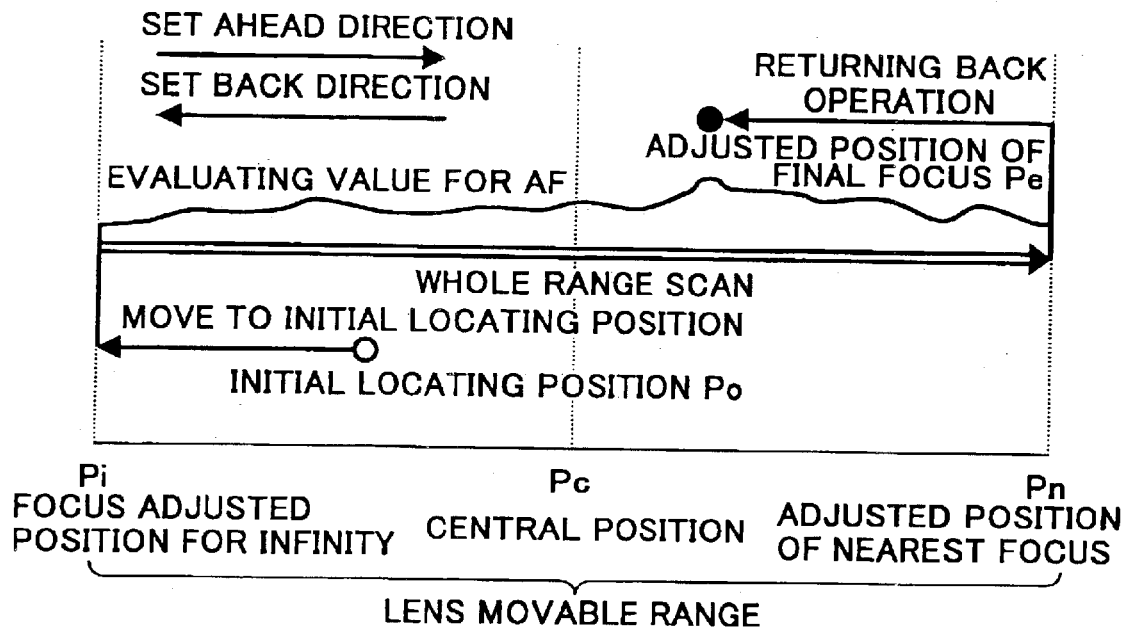
FIG. 12 is a schematic diagram to show an operation of focus adjusting in a first state of a first digital camera in the prior art technology in which speeding up is realized.
Figure 13:
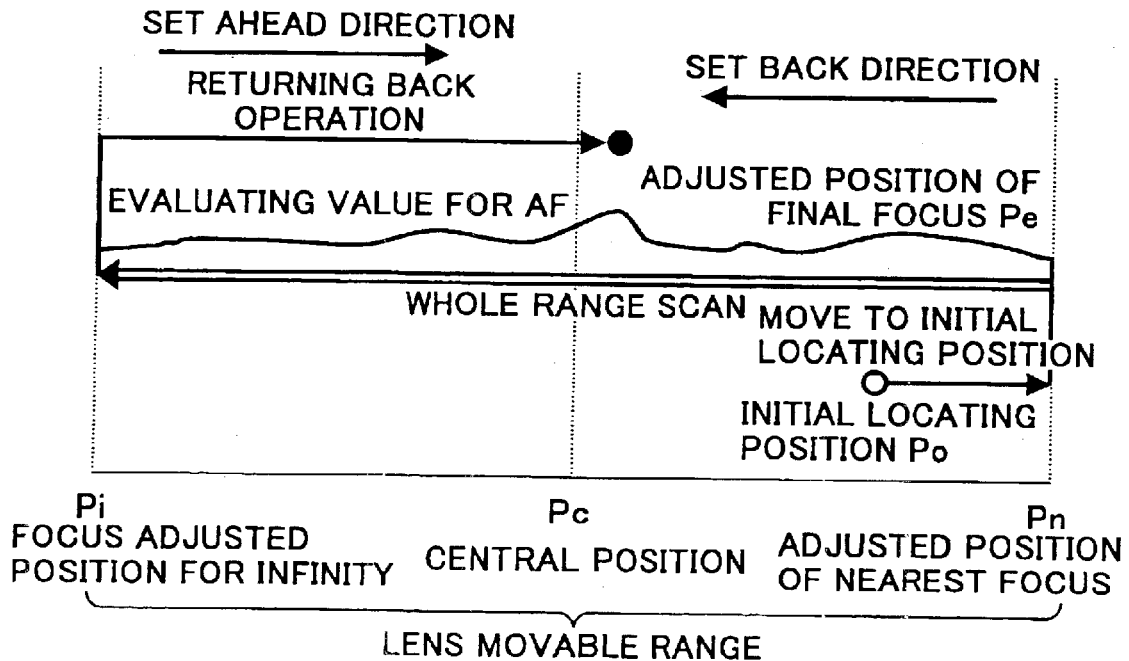
FIG. 13 is a schematic diagram to show an operation of focus adjusting in a second state of the digital camera in the prior art technology depicted in FIG. 12.
Figure 16:
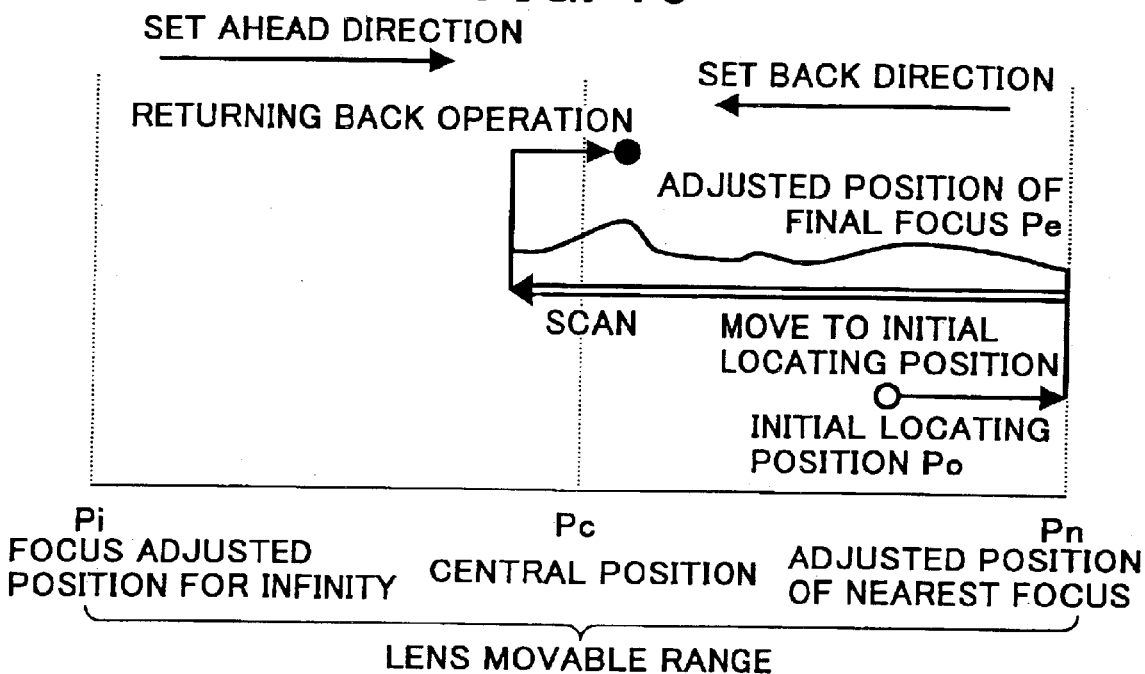
FIG. 16 is a schematic diagram to show an operation of focus adjusting in a second state of the digital camera in the prior art technology depicted in FIG. 15.
Figure 17:
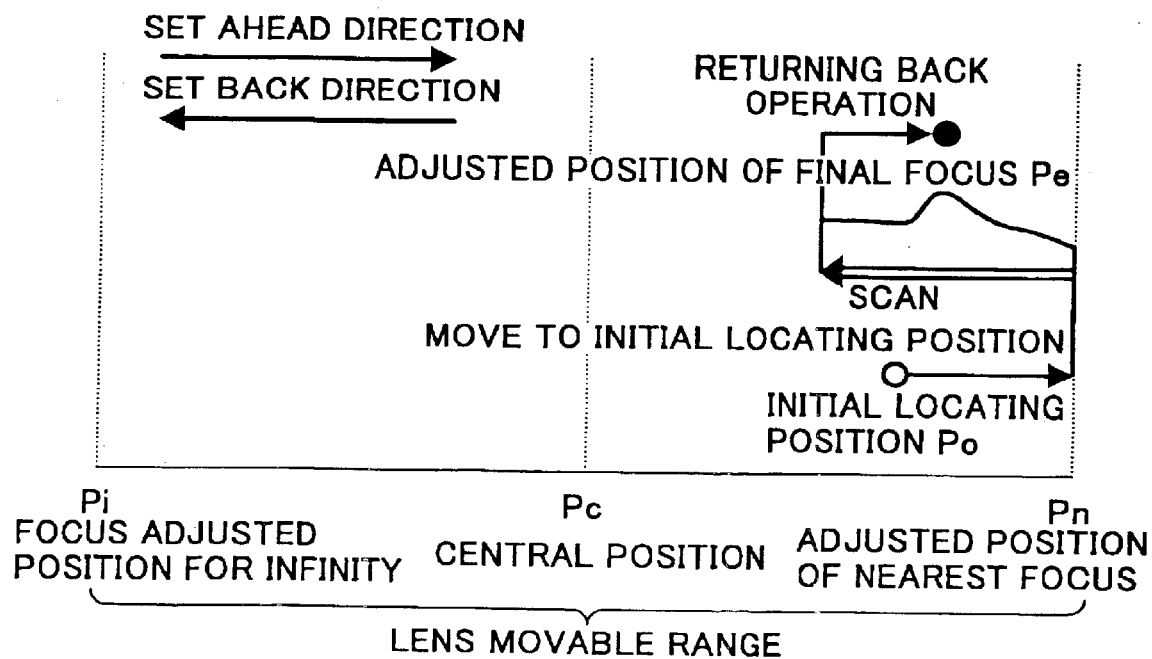
FIG. 17 is a schematic diagram to show an operation of focus adjusting in a third state of the digital camera in the prior art technology depicted in FIG. 15.
Figure 18:
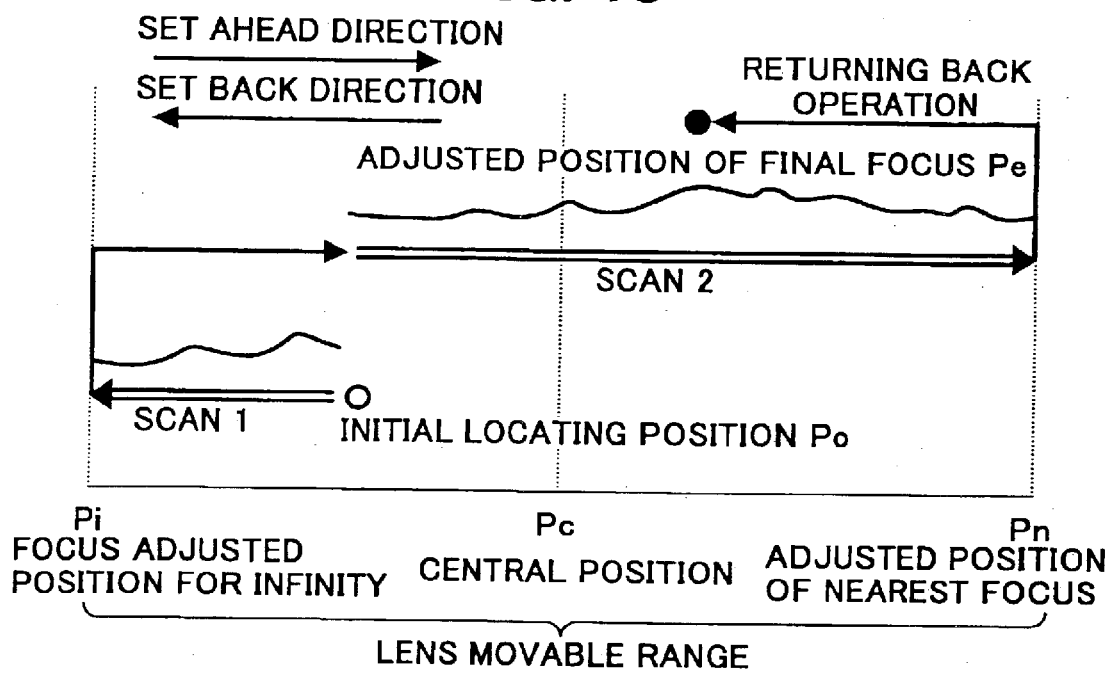
FIG. 18 is a schematic diagram to show an operation of focus adjusting in a first state of a third digital camera in the prior art technology in which speeding up is realized (disclosed in Japanese Laid Open Patent No. Hei 05-241066).
Figure 19:
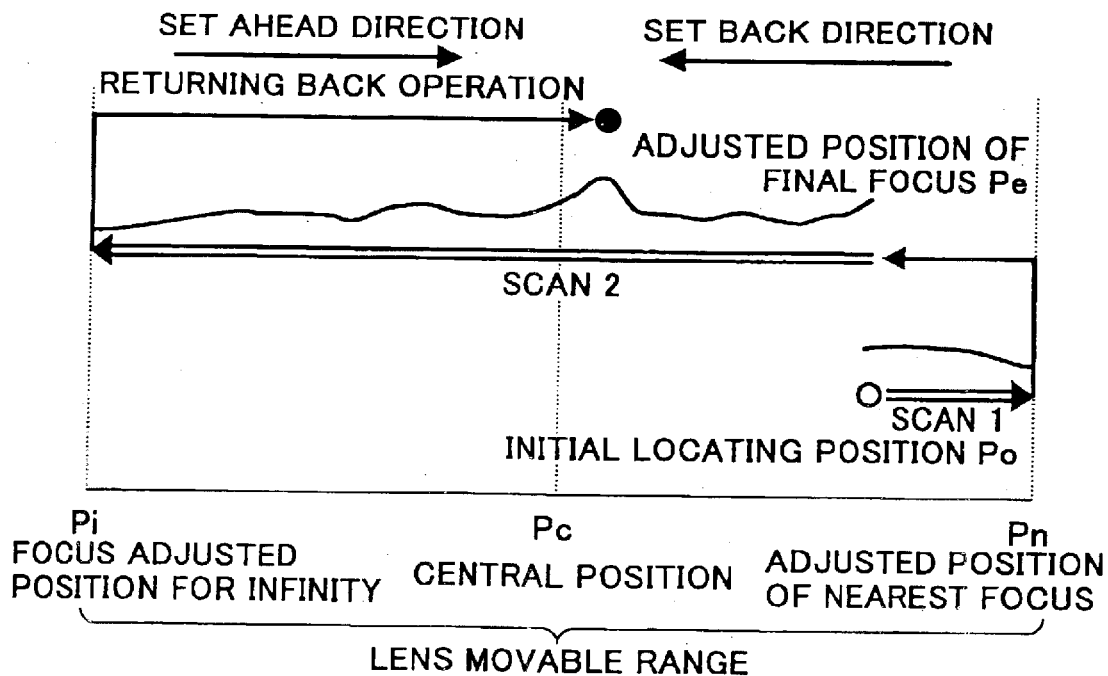
FIG. 19 is a schematic diagram to show an operation of focus adjusting in a second state of the digital camera in the prior art technology depicted in FIG. 18.
Figure 20:
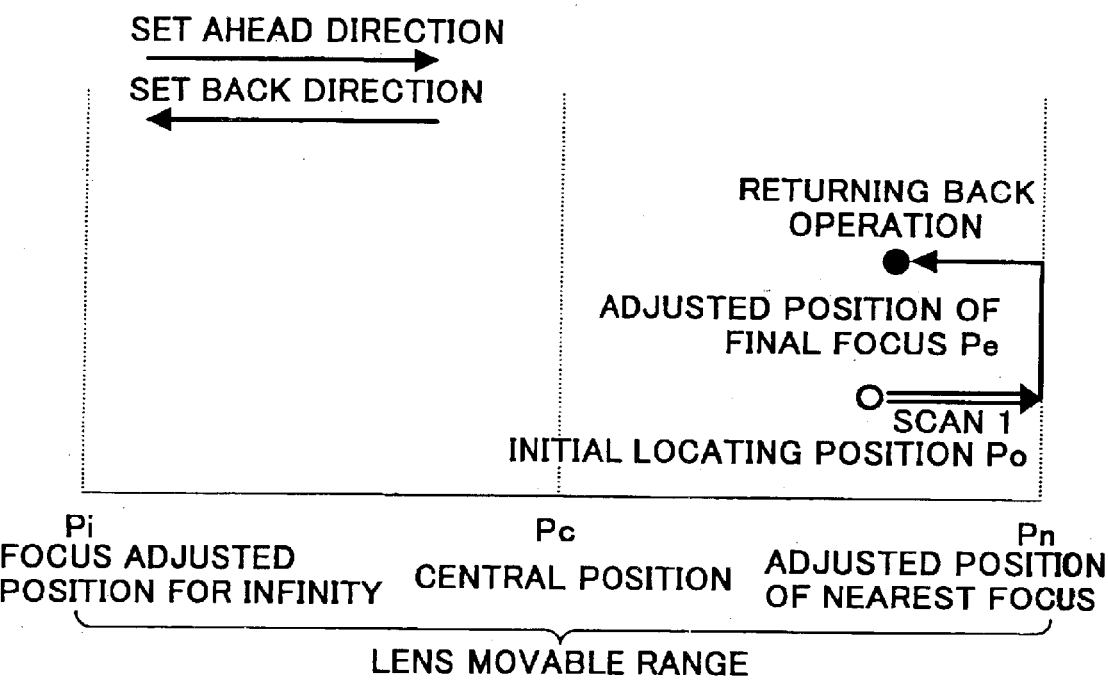
FIG. 20 is a schematic diagram to show an operation of focus adjusting in a third state of the digital camera in the prior art technology depicted in FIG. 18.
Figure 21:
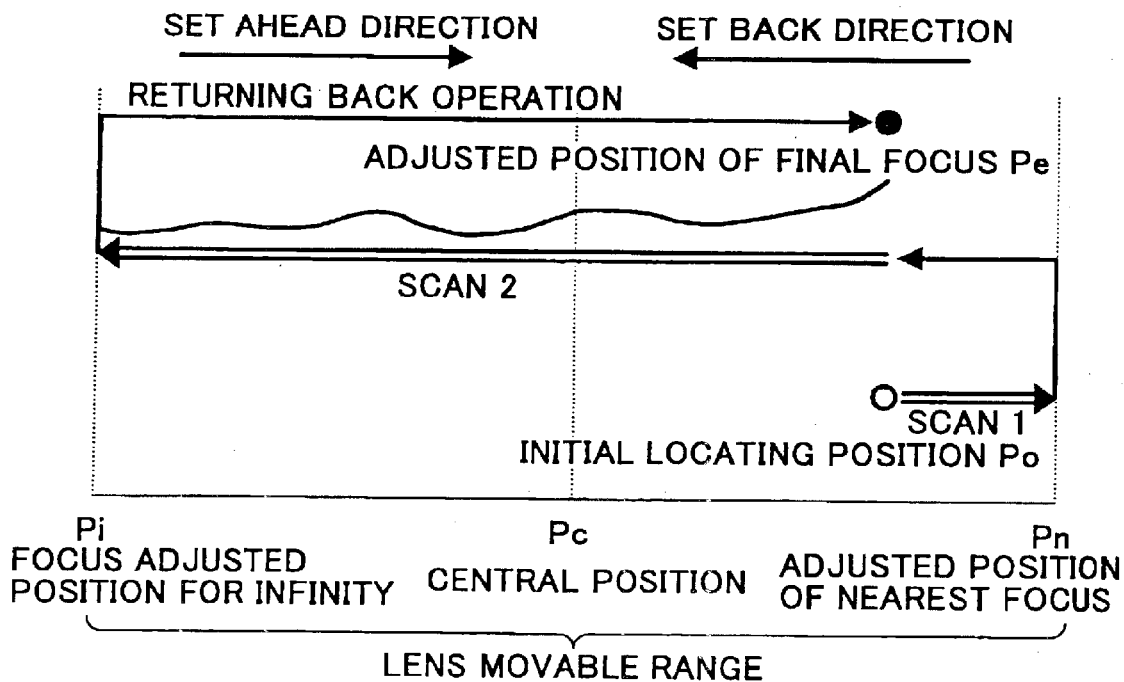
FIG. 21 is a schematic diagram to show an operation of focus adjusting in a forth state of the digital camera in the prior art technology depicted in FIG. 18.
Figure 22:
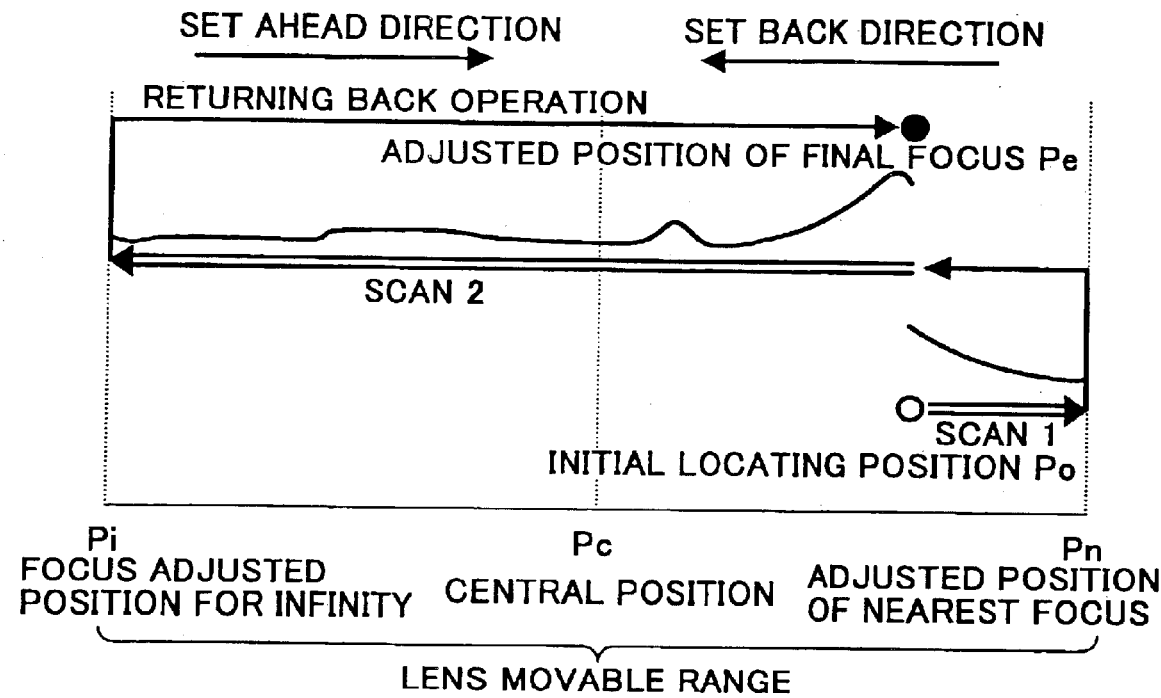
FIG. 22 is a schematic diagram to show an operation of focus adjusting in a fifth state of the digital camera in the prior art technology depicted in FIG. 18.
Figure 23:
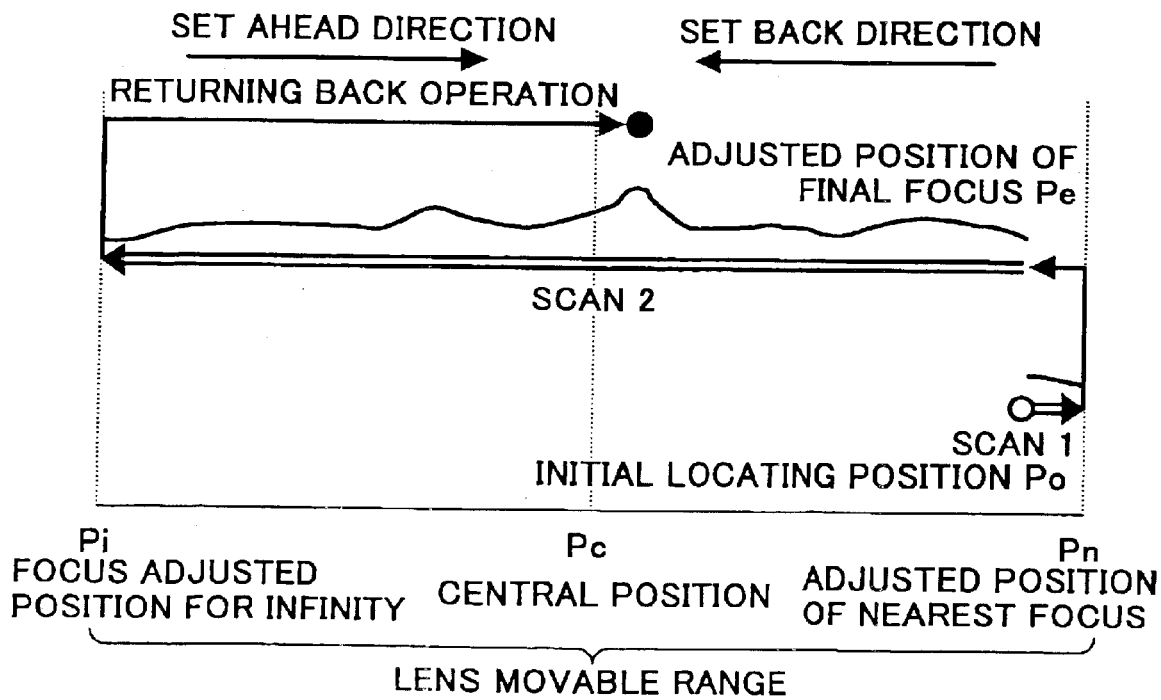
FIG. 23 is a schematic diagram to show an operation of focus adjusting in a sixth state of the digital camera in the prior art technology depicted in FIG. 18.

At first as depicted in FIG. 8 and FIG. 9 when the electric power is turned on (Step #1), an initialization of automatic focus adjusting operation such as initialization of number of times for automatic focus adjusting operation, moving back focusing lens 1a to pan focus position Pj and so on are achieved (Step #2, Step #3), and the device waits that the release pushing unit B is pushed down to half way (Step #5). During these Step #3 and Step #5 the evaluating values for AF are obtained in succession (Step #4), it is utilized later as a material for a judgment "whether does the object to be photographed vary or not?" (Step #9, Step #10). If in a case that the focus adjusting operation is not achieved yet (Nt=0) at this time point, because the above mentioned evaluating value for AF obtaining in succession is not necessary, and it may be recommendable that a judgment whether the evaluating value for AF is obtained or not, is achieved at Step #4, however, because it makes a sequence of process complicated and no special problems are caused by obtaining of not wanted information, in this embodiment it is made to be a sequence obtaining the information always.

When the half pushed down of the release pushing unit B is detected by the unit for detecting half pushing down 13 (Step #5), the device moves to a preparation for taking photograph process in succession to above. At setout judgment if the focus adjusting operation is the first one (Step #6), or if the last focus adjusting operation was terminated in focus adjusting operation fail (AFNG) (Step #7) is achieved and in a case when the focus adjusting operation is a first one or the last focus adjusting operation was ended in focus adjusting operation fail, a value Fr1 is selected as a amount of focus back (Step #8).

This Fr1 (the amount of focus back (Po−Ps) at focus adjusting operation fail (pan focus position) just after the electric power is turned on) is comparatively large value and it is set to scan at first wide area around the pan focus position in consecutive focus adjusting operation. Depending on a structure of the camera it is also possible to set the value Fr1 not comparatively large value but "0" judging from a view point that time factor of the focus adjusting operation is more important.

Further in Step #9 and Step #10, the judgment if the object to be photographed varies from the last focus adjusting operation, is classified in three cases and for respective cases the value Fr are set respectively. That is to say in a case when it is judged that the object to be photographed is perfectly varied, Fr is set to "0" because there is little merit to initiate the scanning with returning from initial locating position (Step #11), on contrary in a case when it is judged that a continuous photographing at almost the same condition is performed, the value of Fr is set in comparatively small value Fr3 (it is a amount of focus back when it is judged as the same scene as the last photographing) (Step #13). In a case when it is judged as an intermediate case between the above mentioned two cases, that is to say it is judged that the object to be photographed is not varied as a main part, the value Fr is set between Fr3 and Fr1 which is a little bit larger than Fr3 (a amount of focus back in a case it is the same scene as a main part (Fr1>Fr2>Fr3)) (Step #12). In this respect it is also recommendable that an elapsed time from the last focus adjusting operation can be included as a factor to judge if the object to be photographed is varied or not. In other words it utilizes a fact that the probability of varying the object to be photographed is high when a long time elapsed from the last focus adjusting operation, and the probability of varying the object to be photographed is low when a long time does not elapse from the last focus adjusted position.

Next in a case when the initial locating position Po is near to any one end points of focus adjusting scan, it is judged a distance to the both end points of focus adjusting scan because it can be expected that higher accuracy for focus adjusting operation is obtained when focus adjusting scan is initiated from the end point after moving to the end point (Step #14, Step #15). When in the first focus adjusting operation or when the last focus adjusting operation was terminated in fail (AFNG), because they have passed the Step #8 it has been already obvious that they do not locate near to end points, however, they are also indicated by putting on the same flow in order to simplify the flow of process. When in a case in Step #15 it is judged that the initial locating position Po locates near to the end point, the focusing lens is moved to the end point which is locating nearer (Step #16), and the focus adjusting scan is initiated toward the end point which is locating farther (Step #17). When the peak is detected during this scan (Step #18, Step #19), and after the scan is interrupted and performs "indication of focus adjusting operation is succeeded (AFOK)", the focusing lens 1a is moved to the peak position (Step #29). In many cases the indication of focus' adjusting operation succeeded and an indication of "focus adjusting operation is fail (AFNG)" which will he described later, are performed by turned on or blinking of focus adjusting operation light emitting diode (AFLED) which is located near around a viewfinder, however, other way can be adoptable. On the other hand when any peak cannot be detected while the whole range scan has completed (Step #18, Step #19), all the evaluating values for AF are checked again to find out any point which can be judged as a peak (Step #27).

At this point the peak detection at Step #18 must be performed in comparatively strict criterion in order to avoid failing of focus adjusting (to adjust focusing on incorrect peak), but the peak detection at Step #27 is performed in comparatively slack criterion because it is performed utilizing all the evaluating value for AF of whole scanning range. In a case when it is judged that the peak is existing in Step #27, the flow goes to Step #29 as well as Step #18 to perform displaying operation and focus adjusting action. On the other hand when any peak has not been detected even after the whole range scanning, an indication for "focus adjusting operation is fail (AFNG)" is performed and the fact that the focus adjusting operation is fail (AFNG) is memorized for next focus adjusting operation and then the focusing lens is moved to the pan focus position (Step #28).

On the other hand in a case it is judged that end point are located farther in Step #15, the focusing lens is moved in a value of Fr which is beforehand set to the end point which is located farther (Step #20), and focus adjusting scan is initiated from the point toward the end point which is located nearer (Step #21). Even in this case the focus adjusting scan is performed while the peak detection is achieved as described above (Step #22, Step #23), when the focusing lens arrives at end point the focusing lens is moved back to the scan starting point of the first scan (scan 1) to scan the remaining range and the focus adjusting operation is continued for the second scan (scan 2) in opposite direction from the first scan (scan 1) toward the end point which is located farther while the peak detection is performed (Step #25, Step #26).

The operation after peak is detected at Step #22 or Step #25 are quite the same as peak detection in Step #18, and the operation after whole range scan is completed (Step #26) are quite the same as scan completion in Step #19.

Then in Step #28 or Step #29 after the indication of result for focus adjusting operation and the driving of focusing lens 1a have been performed, it is judged, if a half pushing down of release button is continued (Step #31), if the release pushing unit B is full pushed (Step #32), by the unit for detecting half pushing down 13 and the unit for detecting full pushing down 14. At this point the evaluating values for AF are continuously obtained (Step #30) and they are used for the next judgment of object to be photographed variation (Step #9, Step #10) as well as for the case of obtaining evaluating value for AF at Step #4.

When in a case cancellation of the half pushing of release button is detected at Step #31, after a number of times for focus adjusting operation action is countered up (Step #34), the flow moves to a waiting state for half pushing down of the release button at the Step #5. When in a case the full pushing of release button is detected at Step #32, after a predetermined photographing operation has been performed (Step #33), a number of times for focus adjusting operation action is countered up in Step #84, and the flow moves to a waiting state for half pushing down of the release button at the Step #5. In any cases the flow is moved to Step #5 in a state that a position of the focusing lens is kept at the focus adjusted position or at the pan focus position set at Step #28 or Step #29.

In FIGS. 2 to 8, the definition of characters is as follows:

Pi: symbol to designate focus adjusted position for infinity

Pn: symbol to designate the adjusted position of nearest focus

Pc: symbol to designate central position between Pi and Pn

Po: symbol to designate position of focusing lens before this automatic focus adjusting operation Pe: symbol to designate position of focusing lens after this automatic focus adjusting operation Ps: symbol to designate scan starting point Pj: symbol to designate pan focus position (Po when powered on, Pe when AFNG)

Fr: amount of focus back

Fr1: amount of focus back just after powered on and AFNG (=pan focus position)

Fr2: amount of focus back when it seemed the almost same scene as the last photographing Fr3: amount of focus back when it seemed quite the same scene as the last photographing Fs: distance from initial locating position Po to end point which is located nearer Fs1: criterion to judge if focus adjusting scan is initiated from the end point.

In this respect explanations about operations other than the focus adjusting operation, such as automatic exposure (AE), automatic white balancing (AWB) and the like are omitted in order to prevent vexatious complication.

The above explanation is described on the digital camera in accordance with one embodiment of the present invention, however, it can be combine with various kind of method as far as it does not depart from main structure of the present invention.

For example if focus adjusting scan is interrupted when the peak is detected/or not, if the direction of scan for the second scanning (scan 2) is made as the same as that of the first scan (scan 1)/or not, and the like have respective merit according to characteristics and required performance of kind of product adapted, and the present invention can be applied to any one of them.

Also in the above description, the explanation were given in the embodiments in which the automatic focus adjusting system utilizing an method for adjusting automatic focus in accordance with the present invention is applied to a digital camera, however, the present invention can be applied to camera of any other type, and the method for adjusting automatic focus and the automatic focus adjusting system in accordance with the present invention can widely be applied to not only camera but any other image input device such as, image scanner or coping machine, or optical observing device and optical image capturing device such as micro scope, telescope, binoculars, endoscope and the like.

According to the present invention as described above, it can be realized that operations related to a focus adjusting scan are regulated to suppress a useless action, and efficiency and reliability of the focus adjusting scan is effectively improved by means including the scan control means which set the scan starting point and the scanning direction of the above mentioned focus adjusting scan such that the focus adjusting operation is initiated from a point that is shifted in the predetermined amount of distance in a predetermined direction from the initial locating position Po toward a opposite direction to the predetermined direction by the scan control means.

According to the present invention as described above, it can be realized that the efficiency of the focus adjusting scan is further specially increased by means that the scan control means controls such that the above mentioned direction is set to a direction that goes to the end point which is located not nearer to the focusing lens between the both ends of the scanning range.

According to the present invention as described above, it can be realized that the efficiency of the focus adjusting scan is further increased when the initial locating position Po is located near to one end the both end points of the focus adjusting scan range by means that including an additional scan control means which set the scan starting point and the direction of focus adjusting scan.

Further according to the camera provided by the present invention, it can be realized that the efficiency of the focus adjusting scan and a reliability of the focus adjusting operation are further increased corresponding to a level of probability of the same situation when the same object to be photographed is continuously photographed by means of the above described arrangement.

Further according to the camera provided by the present invention, it can be realized that the efficiency of the focus adjusting scan and a reliability of the focus adjusting operation are further increased corresponding appropriately to a variation of focal distance in the optical system.

According to the device for capturing object image provided by the present invention as described above, it can be realized that efficiency and reliability of the focus adjusting scan is effectively improved by means of including the scan control means which set the scan starting point and the scanning direction of the above mentioned focus adjusting scan such that the focus adjusting operation is initiated from a point that is shifted in the predetermined amount of distance in a predetermined direction from the initial locating position Po toward a opposite direction to the predetermined direction by the scan control means.

According to the device for capturing object image provided by the present invention it can be realized that the efficiency of the focus adjusting scan is further increased by means that the scan control means controls such that the above mentioned direction is set to a direction that goes to the end point which is located not nearer to the focusing lens between the both ends of the scanning range.

According to the device for capturing object image provided by the present invention, it can be realized that the efficiency of the focus adjusting scan is further specially increased when the initial locating position Po is located near to one end the both end points of the focus adjusting scan range by means of the above described constitution.

Further, according to the device for capturing object image provided by the present invention, it can be realized that the efficiency of the focus adjusting scan and a reliability of the focus adjusting operation are further increased corresponding to a level of probability of the same situation when the same object to be photographed is continuously photographed by means of the above described arrangement.

Further according to the device for capturing object image provided by the present invention an efficiency of the focus adjusting scan and a reliability of focus adjusting can be further improved in a case when the object to be photographed is the same and more adequately corresponding to a level of provability that situation to photographing the same object to be photographed is resemble by means that control means for adjusting focus includes any one of evaluating value storing means which stores a final evaluating value of focus adjusting in the above mentioned focus adjusting operation, and continuous evaluating value storing means which obtains continuously the evaluating value of focus adjusting and stores the value at all time when the power source of the device is turned on, and second variable control means which controls to vary the above mentioned first predetermined amount of distance according to any one of a result of comparison between a final evaluating value of focus adjusting of the last focus adjusting operation that is stored in the above mentioned evaluating value storing means and an evaluating value of focus adjusting when the present focus adjusting operation is started, and a time series alternating state of the evaluating value of focus adjusting that is stored in the above mentioned continuous evaluating value storing means from a time point that the last focus adjusting operation is terminated to a time point that the present focus adjusting operation is started.

Further according to the device for capturing object image provided by the present invention an device for capturing object image as a various kind of apparatus can be provided by means that device for capturing object image is any one of a camera, an image input device including image scanner and copying machines and an optical observing equipment including microscope, telescope, binoculars and endoscope.

According to the automatic focus adjusting system provided by the present invention efficiency and reliability of the focus adjusting scan can be effectively improved especially when the focus adjusting is continuously performed again and again for the same object to be photographed in almost in the same situation by means that the control means for adjusting focus includes a scan control means to set a scan starting point and a direction of the scan such that focus adjusting operation is initiated from a point that is shifted in a predetermined amount of distance in a predetermined direction from an initial locating position Po of the above mentioned focus operating means toward an opposite direction to the above mentioned predetermined direction.

According to the automatic focus adjusting system provided by the present invention, it can be realized that the efficiency of the focus adjusting scan is further increased when the initial locating position Po is located near to one end of the both end portions of the focus adjusting scan range.

According to the automatic focus adjusting system in accordance with the present invention an efficiency of the focus adjusting scan can be further improved when the initial locating position Po is located near to an end portion of range of the focus adjusting scan by means of the above described constitution.

Further according to the automatic focus adjusting system in accordance with the present invention an efficiency of the focus adjusting scan and a reliability of focus adjusting can be further improved in a case when the object to be photographed is the same and corresponding to a level of provability that situation to photographing the same object to be photographed is resemble.

Further according to the automatic focus adjusting system of the present invention an efficiency of the focus adjusting scan and a reliability of focus adjusting can be further improved in a case when the object to be photographed is the same and more adequately corresponding to a level of provability that situation to photographing the same object to be photographed is resemble.

According to the method for adjusting automatic focus of the present invention an efficiency of the focus adjusting scan and a reliability of focus adjusting can be further improved by the above described constitution when the focus adjusting is continuously performed again and again for the same object to be photographed in almost in the same situation.

According to the method for adjusting automatic focus of the present invention it can be realized that efficiency of the focus adjusting scan is especially further improved by means that the above mentioned setting step of scan starting position includes a step to set as the above mentioned predetermined direction a direction toward the end point which is located in farther between the both end points of the scanning range from the above mentioned initial locating position.

Further according to the method for adjusting automatic focus of the present invention it can be realized that an efficiency of the focus adjusting scan is improved by the above mentioned constitution when the initial locating position is near to the end points of focus adjusting scanning range.

What is claimed is:

1. A camera comprising:
a photographing optical system which forms an image of an object to be photographed on an image forming surface;
a means for capturing the image to convert said image of the object to be photographed to an image signal;
a focus operating means to vary a focus adjusting state of the image of the object to be photographed on said means for capturing the image by moving at least any one of said photographing optical system, an optical means which is a portion of said photographing optical system and said means for capturing the image along an optical axis direction;
a focus adjusting evaluating value detecting means seeking an evaluating value of focus adjusting which is indicative of the focus adjusting state as a criterion from image data obtained by said means for capturing the image; and
a control means for adjusting focus which seeks a focus adjusted position where the focus adjusting evaluating value becomes a most appropriate value and drives said focus operating means to said focus adjusted position to perform a focus adjusting by scan in that said focus adjusting evaluating value detecting means is driven while said focus operating means is driven in at least any one of a continuous way and an intermittent way to obtain a plurality of said focus adjusting evaluating value; wherein
said control means for adjusting focus includes a scan control means to set a scan starting point and a direction of a scan such that the focus adjusting operation is initiated from a point that is shifted in a first predetermined amount of distance in a predetermined direction from an initial locating position of said focus operating means toward an opposite direction to said predetermined direction.

2. The camera as claimed in claim 1, wherein said scan control means sets the direction going to an end point which is located farther from said initial locating position between both of end points of a scanning range as said predetermined direction.

3. A camera comprising:
a photographing optical system which forms an image of an object to be photographed on an image forming surface;
a means for capturing the image to convert said image of the object to be photographed to an image signal;
a focus operating means to vary a focus adjusting state of the image of the object to be photographed on said means for capturing the image by moving at least any one of said photographing optical system, an optical means which is a portion of said photographing optical system and said means for capturing the image along an optical axis direction;
a focus adjusting evaluating value detecting means seeking an evaluating value of focus adjusting which is indicative of the focus adjusting state as a criterion from image data obtained by said means for capturing the image; and
a control means for adjusting focus which seeks a focus adjusted position where the focus adjusting evaluating value becomes a most appropriate value and drives said focus operating means to said focus adjusted position to perform a focus adjusting by scan in that said focus adjusting evaluating value detecting means is driven while said focus operating means is driven in at least any one of a continuous way and an intermittent way to obtain a plurality of said focus adjusting evaluating value; wherein
said control means for adjusting focus includes an additional scan control means to set a scan starting point and a direction of a scan such that when in a case that a distance from an initial locating point of said focus operating means to an end point which is located nearer to the initial locating position between both of end points of a focus adjusting scan range, is smaller than a second predetermined amount of distance, after a focusing lens is moved to the nearer end point, then the focus adjusting scan is initiated from the end point toward an other end point.

4. The camera as claimed in any one of claim 1 to claim 2, wherein said control means for adjusting focus includes any one of an operation number discriminating means which discriminates whether the focus adjusting operation performed next is a first focus adjusting operation after an electric power is turned on or is a second or more focus adjusting operation, and an operated result storing means which stores an operated result that designates whether a focus adjusted state is detected or not at said focus adjusting operation, and any one of a first variable control means which controls to vary said first predetermined amount of distance according to a discriminated result by said operation number discriminating means, and a second variable control means which controls to vary said first predetermined amount of distance on the basis of the operated result in the last focus adjusting operation that is stored in said operated result storing means.

5. The camera as claimed in claim 1, wherein said control means for adjusting focus includes any one of an evaluating value storing means which stores a final evaluating value of focus adjusting in said focus adjusting operation, and a continuous evaluating value storing means which obtains continuously the evaluating value of focus adjusting and stores the evaluating value of focus adjusting at all times when a power source of the camera is turned on, and any one of a third variable control means which controls to vary said first predetermined amount of distance according to a result of comparison between the final evaluating value of focus adjusting of the last focus adjusting operation that is stored in said evaluating value storing means and an evaluating value of focus adjusting when the present focus adjusting operation is started, and a fourth variable control means which controls to vary said first predetermined amount of distance according to a time series alternating state of the evaluating value of focus adjusting that is stored in said continuous evaluating value storing means from a time point that the last focus adjusting operation is terminated to a time point that the present focus adjusting operation is started.

6. The camera as claimed in claim 1, wherein said photographing optical system comprises a variable focal distance optical system and a focal distance output means which outputs a focal distance information which is related to its focal distance, and said control means for adjusting focus includes a fifth variable control means which controls to vary said first predetermined amount of distance according to the focal distance information output from said focal distance output means.

7. A device for capturing an object image comprising:
a means for capturing an image to obtain the object image;
an image data obtaining means to obtain object information according to the object image from said object image;
a focus operating means which varies a focus adjusting state of the object image obtained by said means for capturing the image;
a focus adjusting evaluating value detecting means which seeks an evaluating value of focus adjusting as a criterion of the focus adjusting state from image data obtained by said image data obtaining means;
a control means for adjusting focus which seeks a focus adjusted position where the focus adjusting evaluating value becomes a most appropriate value and drives said focus operating means to said focus adjusted position to perform a focus adjusting by scan in that said focus adjusting evaluating value detecting means is driven while said focus operating means is driven in at least any one of a continuous way and an intermittent way to obtain a plurality of said focus adjusting evaluating value; wherein
said control means for adjusting focus includes a scan control means to set a scan starting point and a direction of a scan such that the focus adjusting operation is initiated from a point that is shifted in a first predetermined amount of distance in a predetermined direction from an initial locating position of said focus operating means toward an opposite direction to said predetermined direction.

8. The device for capturing the object image as claimed in claim 7, where said scan control means sets the direction going to an end point which is located farther from said initial locating position between both of end points of a scanning range as said predetermined direction.

9. A device for capturing an object image comprising:
a means for capturing an image to obtain the object image;
an image data obtaining means to obtain object information according to the object image from said object image;
a focus operating means which varies a focus adjusting state of the object image obtained by said means for capturing the image;
a focus adjusting evaluating value detecting means which seeks an evaluating value of focus adjusting as a criterion of the focus adjusting state from image data obtained by said image data obtaining means;
a control means for adjusting focus which seeks a focus adjusted position where the focus adjusting evaluating value becomes a most appropriate value and drives said focus operating means to said focus adjusted position to perform a focus adjusting by scan in that said focus adjusting evaluating value detecting means is driven while said focus operating means is driven in at least any one of a continuous way and an intermittent way to obtain a plurality of said focus adjusting evaluating value; wherein
said control means for adjusting focus includes an additional scan control means to set a scan starting point and a direction of a scan such that when in a case that a distance from an initial locating point of said focus operating means to an end point which is located nearer to the initial locating position between both of end points of a focus adjusting scan range, is smaller than a second predetermined amount of distance, after a focusing lens is moved to the nearer end point, then the focus adjusting scan is initiated from the end point toward an other end point.

10. The device for capturing the object image as claimed in any one of claim 7 to claim 8, wherein said control means for adjusting focus includes at least any one of an operation number discriminating means which discriminates whether the focus adjusting operation performed next is a first focus adjusting operation after an electric power is turned on or is a second or more focus adjusting operation, an operated result storing means which stores an operated result that designates whether a focus adjusted state is detected or not at said focus adjusting operation, and a focal distance output means which outputs a focal distance information related to its focal distance of said means for capturing the image; and a first variable control means which controls to vary said first predetermined amount of distance according to at least one of a discriminated result by said operation number discriminating means, the operated result in the last focus adjusting operation that is stored in said operated result storing means and the focal distance information by said focal distance output means.

11. The device for capturing the object image as claimed in claim 7, wherein said control means for adjusting focus includes any one of an evaluating value storing means which stores a final evaluating value of focus adjusting in said focus adjusting operation and a continuous evaluating value storing means which obtains continuously the evaluating value of focus adjusting and stores the evaluating value of focus adjusting at all times when a power source of the device is turned on, and a second variable control means which controls to vary said first predetermined amount of distance according to at least one of a result of comparison between a final evaluating value of focus adjusting of the last focus adjusting operation that is stored in said evaluating value storing means and an evaluating value of focus adjusting when the present focus adjusting operation is started, and a time series alternating state of the evaluating value of focus adjusting that is stored in said continuous evaluating value storing means from a time point that the last focus adjusting operation is terminated to a time point that the present focus adjusting operation is started.

12. The device for capturing the object image as claimed in claim 7, wherein said device for capturing the object image comprises any one of a camera, an image input device including image scanner and copying machine, and an optical observing equipment including microscope, telescope, binoculars and endoscope.

13. An automatic focus adjusting system comprising:
a focus operating means to vary a focus adjusting state of an object image;
a focus adjusting evaluating value detecting means seeking an evaluating value of focus adjusting which is indicative of the focus adjusting state as a criterion from an object to be photographed image data corresponding to the object image; and a control means for adjusting focus which seeks a focus adjusted position where the focus adjusting evaluating value becomes a most appropriate value and drives said focus operating means to said focus adjusted position to perform a focus adjusting by scan in that said focus adjusting evaluating value detecting means is driven while said focus operating means is driven in at least any one of a continuous way and an intermittent way to obtain a plurality of said focus adjusting evaluating value; wherein said control means for adjusting focus includes a scan control means to set a scan starting point and a direction of a scan such that the focus adjusting operation is initiated from a point that is shifted in a first predetermined amount of distance in a predetermined direction from an initial locating position of said focus operating means toward an opposite direction to said predetermined direction.

14. The automatic focus adjusting system as claimed in claim 13, wherein said scan control means sets the direction going to an end point which is located farther from said initial locating position between both of end points of a scanning range as said predetermined direction.

15. An automatic focus adjusting system comprising:

a focus operating means to vary a focus adjusting state of an object image;

a focus adjusting evaluating value detecting means seeking an evaluating value of focus adjusting which is indicative of the focus adjusting state as a criterion from an object to be photographed image data corresponding to the object image; and a control means for adjusting focus which seeks a focus adjusted position where the focus adjusting evaluating value becomes a most appropriate value and drives said focus operating means to said focus adjusted position to perform a focus adjusting by scan in that said focus adjusting evaluating value detecting means is driven while said focus operating means is driven in at least any one of a continuous way and an intermittent way to obtain a plurality of said focus adjusting evaluating value; wherein said control means for adjusting focus includes an additional scan control means to set a scan starting point and a direction of a scan such that when in a case that a distance from an initial locating point of said focus operating means to an end point which is located nearer to the initial locating position between both of end points of a focus adjusting scan range, is smaller than a second predetermined amount of distance, after a focusing lens is moved to the nearer end point, then the focus adjusting scan is initiated from the end point toward an other end point.

16. The automatic focus adjusting system as claimed in any one of claim 13 to claim 15, wherein said control means for adjusting focus includes any one of an operation number discriminating means which discriminates whether the focus adjusting operation performed next is a first focus adjusting operation after an electric power is turned on or is a second or more focus adjusting operation, an operated result storing means which stores an operated result that designates whether a focus adjusted state is detected or not at said focus adjusting operation, a focal distance output means which output a focal distance information related to its focal distance, and a first variable control means which controls to vary at least one of said first predetermined amount of distance and said second predetermined amount of distance according to at least one of a discriminated result by said operation number discriminating means, the operated result in the last focus adjusting operation that is stored in said operated result storing means and the focal distance information by said focal distance output means.

17. The automatic focus adjusting system as claimed in claim 13, wherein said control means for adjusting focus includes any one of an evaluating value storing means which stores a final evaluating value of focus adjusting in said focus adjusting operation, and a continuous evaluating value storing means which obtains continuously the evaluating value of focus adjusting and stores the evaluating value of focus adjusting at all times when a power source of the automatic focus adjusting system is turned on, and a second variable control means which controls to vary said first predetermined amount of distance according to at least one of a result of comparison between a final evaluating value of focus adjusting of the last focus adjusting operation that is stored in said evaluating value storing means and an evaluating value of focus adjusting when the present focus adjusting operation is started, and a time series alternating state of the evaluating value of focus adjusting that is stored in said continuous evaluating value storing means from a time point that the last focus adjusting operation is terminated to a time point that the present focus adjusting operation is started.

18. A method for adjusting automatic focus comprising:

varying a focus adjusting state of an object image;

seeking an evaluating value of focus adjusting which is indicative of the focus adjusting state as a criterion from object image information according to the object image; and performing a focus adjusting at which the focus adjusting evaluating value becomes a most appropriate value by scan in that said focus adjusting state is varied in at least any one of a continuous way and an intermittent way to obtain a plurality of said focus adjusting evaluating value;

scanning a starting point setting to shift a scan starting point in a first predetermined amount of distance in a predetermined direction from an initial locating position of said focus adjusting scan; and scanning initiating to initiate a scan toward an opposite direction to said predetermined direction.

19. The method for adjusting automatic focus as claimed in claim 18, further comprising:

setting a direction going to an end point which is located farther from said initial locating position between both of end points of a scanning range as said predetermined direction.

20. A method for adjusting automatic focus comprising:

varying a focus adjusting state of an object image;

seeking an evaluating value of focus adjusting which is indicative of the focus adjusting state as a criterion from object image information according to the object image; and performing a focus adjusting at which the focus adjusting evaluating value becomes a most appropriate value by scan in that said focus adjusting state is varied in at least any one of a continuous way and an intermittent way to obtain a plurality of said focus adjusting evaluating value;

scanning position discriminating to judge if a distance from an initial locating point of said focus adjusting scan to an end point which is located nearer to the initial locating position between both of end points of a focus adjusting scan range, is smaller than a second predetermined amount of distance;

scanning a starting point setting to move a scan starting point to said nearer end point when in a case the distance from the initial locating point of said focus adjusting scan to the end point which is located nearer is shorter than the second predetermined amount of distance; and scanning initiating to initiate the focus adjusting scan from the end point toward an other end point after the moving of said scan starting point has been completed.

21. The camera as claimed in claim 3, wherein said control means for adjusting focus includes any one of an evaluating value storing means which stores a final evaluating value of focus adjusting in said focus adjusting operation, and a continuous evaluating value storing means which obtains continuously the evaluating value of focus adjusting and stores the evaluating value of focus adjusting at all times when a power source of the camera is turned on, and any one of a third variable control means which controls to vary a first predetermined amount of distance according to a result of comparison between the final evaluating value of focus adjusting of the last focus adjusting operation that is stored in said evaluating value storing means and an evaluating value of focus adjusting when the present focus adjusting operation is started, and a fourth variable control means which controls to vary said first predetermined amount of distance according to a time series alternating state of the evaluating value of focus adjusting that is stored in said continuous evaluating value storing means from a time point that the last focus adjusting operation is terminated to a time point that the present focus adjusting operation is started.

22. The camera as claimed in claim 3, wherein said photographing optical system comprises a variable focal distance optical system and a focal distance output means which outputs a focal distance information which is related to its focal distance, and said control means for adjusting focus includes a fifth variable control means which controls to vary said second predetermined amount of distance according to the focal distance information output from said focal distance output means.

23. The device for capturing the object image as claimed in claim 9, wherein said device for capturing the object image comprises any one of a camera, an image input device including image scanner and copying machine, and an optical observing equipment including microscope, telescope, binoculars and endoscope.

24. The camera as claimed in claim 3, wherein said control means for adjusting focus includes any one of an operation number discriminating means which discriminates whether the focus adjusting operation performed next is a first focus adjusting operation after an electric power is turned on or is a second or more focus adjusting operation, and an operated result storing means which stores an operated result that designates whether a focus adjusted state is detected or not at said focus adjusting operation, and any one of a first variable control means which controls to vary said second predetermined amount of distance according to a discriminated result by said operation number discriminating means, and a second variable control means which controls to vary said second predetermined amount of distance on the basis of the operated result in the last focus adjusting operation that is stored in said operated result storing means.

25. The device for capturing the object image as claimed in claim 9, wherein said control means for adjusting focus includes at least any one of an operation number discriminating means which discriminates whether the focus adjusting operation performed next is a first focus adjusting operation after an electric power is turned on or is a second or more focus adjusting operation, an operated result storing means which stores an operated result that designates whether a focus adjusted state is detected or not at said focus adjusting operation, and a focal distance output means which outputs a focal distance information related to its focal distance of said means for capturing the image; and a first variable control means which controls to vary said second predetermined amount of distance according to at least one of a discriminated result by said operation number discriminating means, the operated result in the last focus adjusting operation that is stored in said operated result storing means and the focal distance information by said focal distance output means.

* * * * *